US011274922B2

(12) United States Patent
Wang et al.

(10) Patent No.: US 11,274,922 B2
(45) Date of Patent: Mar. 15, 2022

(54) METHOD AND APPARATUS FOR BINOCULAR RANGING

(71) Applicant: BEIJING TUSEN ZHITU TECHNOLOGY CO., LTD., Beijing (CN)

(72) Inventors: Naiyan Wang, Beijing (CN); Yuanqin Lu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 360 days.

(21) Appl. No.: 16/290,798

(22) Filed: Mar. 1, 2019

(65) Prior Publication Data

US 2019/0301861 A1  Oct. 3, 2019

(30) Foreign Application Priority Data

Mar. 2, 2018  (CN) .......................... 201810174829.1

(51) Int. Cl.
*G01C 3/04* (2006.01)
*G01C 11/16* (2006.01)
(Continued)

(52) U.S. Cl.
CPC ................ *G01C 3/04* (2013.01); *G01C 11/16* (2013.01); *G03B 13/20* (2013.01); *G06T 7/80* (2017.01)

(58) Field of Classification Search
CPC .... H04N 13/289; H04N 5/247; H04N 5/2253; H04N 13/239; H04N 2013/0081;
(Continued)

(56) References Cited

U.S. PATENT DOCUMENTS 9,916,667 B2    3/2018  Choi et al.
2012/0162374 A1* 6/2012  Markas ................ H04N 13/221
                                                         348/46
(Continued)

FOREIGN PATENT DOCUMENTS

CN    101605270 A    7/2009
CN    102034265 B    7/2012
(Continued)

OTHER PUBLICATIONS

Office Action in Chinese Patent Application No. 201810174329.1 dated Dec. 3, 2020.
(Continued)

*Primary Examiner* — Luke D Ratcliffe
(74) *Attorney, Agent, or Firm* — Paul Liu; Julie J. Muyco; Perkins Coie, LLP

(57) ABSTRACT

The present disclosure provides a method and an apparatus for binocular ranging, capable of achieving an improved accuracy of binocular ranging. The method includes: extracting features from a left image and a right image to obtain a left feature image and a right feature image; selecting a standard feature image and obtaining a cost volume of the standard feature image by applying a correlation calculation to the left feature image and the right feature image using a block matching algorithm; obtaining a confidence volume by normalizing computational costs of all disparity values in a disparity dimension for each pixel point in the cost volume; obtaining a confidence map by selecting a maximum value from confidence levels of all the disparity values in the disparity dimension for each pixel point in the confidence volume; obtaining a mask map by mapping each pixel point having a confidence level higher than a predetermined threshold in the confidence map to 1 and mapping each pixel point having a confidence level lower than or equal to the threshold in the confidence map
(Continued)

to 0; obtaining a disparity map by calculating an argmax value for the confidence levels of all disparity values in the disparity dimension for each pixel point in the confidence volume; obtaining a target disparity map by multiplying the mask map with the disparity map; and estimating a distance based on the target disparity map.

14 Claims, 18 Drawing Sheets

(51) Int. Cl.
*G06T 7/80* (2017.01)
*G03B 13/20* (2021.01)

(58) Field of Classification Search
CPC ......... G01B 11/14; G01B 11/22; G06T 7/593; G06T 7/70; G06T 7/20; G06T 7/579; G06T 2207/10004; G06T 2207/10012; G06T 2207/10028; G06T 7/80; G01C 3/04; G01C 11/16; G03B 13/20
See application file for complete search history.

(56) References Cited

U.S. PATENT DOCUMENTS

2017/0024904 A1   1/2017   Samarasekera et al.
2017/0214846 A1*  7/2017   Du ...................... H04N 5/2258

FOREIGN PATENT DOCUMENTS

| CN | 106340036 A | * | 1/2017 |
| CN | 107578430 A |   | 7/2017 |
| CN | 107392898 A |   | 11/2017 |
| CN | 107578430 A |   | 1/2018 |
| CN | 110220493 A |   | 3/2018 |

OTHER PUBLICATIONS

Chinese Application No. 201810174829.1 Second Office Action dated Apr. 19, 2021.
Chinese Application No. 201810174829.1 First Search dated Nov. 26, 2020.

* cited by examiner

METHOD AND APPARATUS FOR BINOCULAR RANGING

CROSS REFERENCE RELATED APPLICATIONS

This U.S. patent document claims the priority of and the benefits of Chinese Patent Application No. 201810174829.1 of the same title and content that was filed by Applicant Beijing Tusen Weilai Technology Co., Ltd. at the State Intellectual Property Office of China (SIPO) on Mar. 2, 2018. The entirety of the aforementioned patent application is incorporated by reference herein.

TECHNICAL FIELD

The present disclosure relates to computer vision technology, and more particularly, to a method and an apparatus for binocular ranging.

BACKGROUND

Binocular ranging is a vision-based algorithm based on calculation of positional disparity values between a left image and a right image captured by a binocular camera at a particular time instant. With the development of autonomous driving technology, binocular ranging has become an essential technique in the autonomous driving technology. As shown in FIG. 1, a conventional binocular ranging algorithm includes the following steps.

At step a, the left image is used as a standard image, and a block matching algorithm is applied to the left image and the right image to obtain a cost volume of the standard image.

At step b, a cost aggregation is applied to the cost volume.

At step c, for each pixel point in the aggregated cost volume, a disparity value having the smallest cost value is selected as an output for the pixel point, so as to obtain a disparity map $D_L$ with the left image being the standard image.

At step d, the right image is used as the standard image and the steps a~c are repeated to obtain a disparity map $D_R$ with the right image being the standard image.

At step e, a left right consistency check is applied to the disparity map $D_L$ and the disparity map $D_R$, to filter out inconsistent points.

At step f, the points filtered out in the step e are populated using a filter, to obtain a complete, dense disparity map.

At step g, a distance is estimated based on the disparity map obtained in the step f.

In recent years, with the development of deep learning, conventional binocular ranging algorithms have undergone rapid development. However, various deep learning based binocular ranging algorithms do not go beyond the processes of the conventional binocular ranging algorithms, with only some steps being improved or combined. In Jure bontar, et al., *Stereo Matching by Training a Convolutional Neural Network to Compare Image Patches*, 2015, for feature representations in the block matching algorithm, conventional manually designed features are replaced with a neural network, and subsequent steps are the same as those in the conventional binocular ranging algorithms. In Nikolaus Mayer, et al., *A Large Dataset to Train Convolutional Networks for Disparity, Optical Flow, and Scene Flow Estimation*, 2015, all steps are combined into a neural network. While the improved binocular ranging algorithms have made some progress when compared with the conventional binocular ranging algorithms, it is difficult to achieve further improvements due to the nature of neural networks that makes it hard to interpret. In Lidong Yu, et al., *Deep Stereo Matching with Explicit Cost Aggregation Sub-Architecture*, 2018, the step b is considered separately, and the cost aggregation operation is performed using a separate neural network. However, as the network structure of the neural network is highly complicated, it cannot operate in real time as desired.

However, in practice, it has been found by those skilled in the art that the complete, dense disparity map obtained in the related art contains many pixel points having low confidence levels or matching errors (for example, when the left image is the standard image and the right image is a reference image, some pixel points in the left image may not have matched pixel points in the right image, e.g., due to obstruction, or some pixel points in the left image may have repetitive texture (e.g., curbs, street lamps, fences or the like) and each of these pixel points may have more than one matched pixel point in the right image). Hence, the distance estimated based on the disparity map may not be accurate.

SUMMARY

In view of the above problem, the present disclosure provides a method and an apparatus for binocular ranging, capable of solving the problem in the related art associated with low accuracy in binocular ranging.

In a first aspect, according to some embodiments of the present disclosure, a method for binocular ranging is provided. The method includes: extracting features from a left image and a right image captured by a binocular camera to obtain a left feature image and a right feature image; selecting one of the left feature image and the right feature image as a standard feature image, and obtaining a cost volume of the standard feature image by applying a correlation calculation to the left feature image and the right feature image using a block matching algorithm; obtaining a confidence volume by normalizing computational costs of all disparity values in a disparity dimension for each pixel point in the cost volume; obtaining a confidence map by selecting a maximum value from confidence levels of all the disparity values in the disparity dimension for each pixel point in the confidence volume; obtaining a mask map by mapping each pixel point having a confidence level higher than a predetermined threshold in the confidence map to 1, and mapping each pixel point having a confidence level lower than or equal to the threshold in the confidence map to 0; obtaining a disparity map by calculating an argmax value for the confidence levels of all disparity values in the disparity dimension for each pixel point in the confidence volume; obtaining a target disparity map by multiplying the mask map with the disparity map; and estimating a distance based on the target disparity map.

In a second aspect, according to an embodiment of the present disclosure, an apparatus for binocular ranging is provided. The apparatus includes: a feature extraction unit configured to extract features from a left image and a right image captured by a binocular camera to obtain a left feature image and a right feature image; a cost volume generation unit configured to select one of the left feature image and the right feature image as a standard feature image, and obtain a cost volume of the standard feature image by applying a correlation calculation to the left feature image and the right feature image using a block matching algorithm; a confidence volume generation unit configured to obtain a confidence volume by normalizing computational costs of all disparity values in a disparity dimension for each pixel point in the cost volume; a confidence map generation unit configured to obtain a confidence map by selecting a maximum value from confidence levels of all the disparity values in the disparity dimension for each pixel point in the confidence volume; a mask map generation unit configured to obtain a mask map by mapping each pixel point having a confidence level higher than a predetermined threshold in the confidence map to 1, and mapping each pixel point having a confidence level lower than or equal to the threshold in the confidence map to 0; a disparity map generation unit configured to obtain a disparity map by calculating an argmax value for the confidence levels of all disparity values in the disparity dimension for each pixel point in the confidence volume; a target disparity map generation unit configured to obtain a target disparity map by multiplying the mask map with the disparity map; and a ranging unit configured to estimate a distance based on the target disparity map.

In a third aspect, according to some embodiments of the present disclosure, a method for binocular ranging is provided. The method includes: extracting features from a left image and a right image captured by a binocular camera to obtain a left feature image and a right feature image; obtaining a first target disparity map by performing a target disparity map generation step with the left feature image being a standard feature image and the right feature image being a reference feature image; obtaining a second target disparity map by performing the target disparity map generation step with the right feature image being the standard feature image and the left feature image being the reference feature image; selecting one of the first target disparity map and the second target disparity map as a standard target disparity map and the other one as a reference target disparity map, and obtaining a third target disparity map by filtering out each pixel point in the standard target disparity map that is inconsistent with its corresponding pixel point in the reference target disparity map; and estimating a distance based on the third target disparity map. The target disparity map generation step includes: obtaining a cost volume of the standard feature image by applying a correlation calculation to the left feature image and the right feature image using a block matching algorithm; obtaining a confidence volume by normalizing computational costs of all disparity values in a disparity dimension for each pixel point in the cost volume; obtaining a confidence map by selecting a maximum value from confidence levels of all the disparity values in the disparity dimension for each pixel point in the confidence volume; obtaining a mask map by mapping each pixel point having a confidence level higher than a predetermined threshold in the confidence map to 1, and mapping each pixel point having a confidence level lower than or equal to the threshold in the confidence map to 0; obtaining a disparity map by calculating an argmax value for the confidence levels of all disparity values in the disparity dimension for each pixel point in the confidence volume; and obtaining a target disparity map by multiplying the mask map with the disparity map.

In a fourth aspect, according to some embodiments of the present disclosure, an apparatus for binocular ranging is provided. The apparatus includes: a feature extraction unit configured to extract features from a left image and a right image captured by a binocular camera to obtain a left feature image and a right feature image; a first target disparity map generation unit configured to generate a first target disparity map by using a target disparity map generation unit with the left feature image being a standard feature image and the right feature image being a reference feature image; a second target disparity map generation unit configured to generate a second target disparity map by using the target disparity map generation unit with the right feature image being the standard feature image and the left feature image being the reference feature image; a third target disparity map generation unit configured to select one of the first target disparity map and the second target disparity map as a standard target disparity map and the other one as a reference target disparity map, and obtain a third target disparity map by filtering out each pixel point in the standard target disparity map that is inconsistent with its corresponding pixel point in the reference target disparity map; a ranging unit configured to estimate a distance based on the third target disparity map; and the target disparity map generation unit configured to obtain a cost volume of the standard feature image by applying a correlation calculation to the left feature image and the right feature image using a block matching algorithm; obtain a confidence volume by normalizing computational costs of all disparity values in a disparity dimension for each pixel point in the cost volume; obtain a confidence map by selecting a maximum value from confidence levels of all the disparity values in the disparity dimension for each pixel point in the confidence volume; obtain a mask map by mapping each pixel point having a confidence level higher than a predetermined threshold in the confidence map to 1, and mapping each pixel point having a confidence level lower than or equal to the threshold in the confidence map to 0; obtain a disparity map by calculating an argmax value for the confidence levels of all disparity values in the disparity dimension for each pixel point in the confidence volume; and obtain a target disparity map by multiplying the mask map with the disparity map.

With the solutions according to the present disclosure, after a cost volume of a standard feature image is obtained using a block matching algorithm, all disparity values in a disparity dimension for each pixel point in the cost volume are normalized to obtain a confidence volume. After the confidence volume is obtained, on one hand, an argmax value for the confidence levels of all disparity values in the disparity dimension for each pixel point in the confidence volume is calculated as an output, such that a complete, dense disparity map may be obtained. However, this disparity map contains many pixel points having low confidence levels or matching errors. On the other hand, a confidence map is obtained by selecting a maximum value from confidence levels of all the disparity values in the disparity dimension for each pixel point in the confidence volume, and the confidence map is converted into "0"s and "1"s to obtain a mask map. Finally, a target disparity map is obtained by multiplying the mask map with the disparity map, such that those pixel points having low confidence levels or matching errors in the disparity map may be filtered out and only the pixel points having high confidence levels will be maintained. A distance may be estimated more accurately based on the target disparity map.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In a 3D world, one single point has different positions in a left image and a right image captured by a binocular camera. Assuming a point P in a 3D world, its position in a left image is at a pixel point A, and its position in a right image is at a pixel point B. Assuming that the left image is a standard image and the right image is a reference image, the pixel point B in the reference image is a reference pixel point matched with the pixel point A. A difference between the positions of the pixel point A and the pixel point B may be calculated to obtain a disparity value D for the pixel point A (a disparity value of n indicates that there is a disparity of n pixels between the pixel point A and the pixel point B). A distance between the point P and the binocular camera may be estimated based on the disparity value D. In particular, it may be calculated as:

$$L = \frac{B \times f}{D} \quad (1)$$

where L denotes the distance between the point P and the binocular camera, B denotes a baseline of the binocular camera, f is a focal length of the binocular camera, and D is the disparity value.

In the field of automated driving, a distance to a target object may typically be measured using such binocular ranging scheme as follows. First, a disparity value corresponding to each pixel point in a standard image is obtained. Then, by using a target detection algorithm, it is determined which pixel points in the standard image belong to one and the same target object. A distance between the target object and the binocular camera may be estimated based on the disparity values of the respective pixel points corresponding to the target object. For example, the target object may be a vehicle. It is assumed that a binocular camera captures a left image and a right image at the same time, both including one and the same vehicle. With the left image being a standard image and the right image being a reference image, disparity values for all pixel points in the left image are calculated. By using a target detection algorithm, a plurality of pixel points corresponding to the vehicle in the left image may be determined. An average value or median value of the disparity values for the plurality of pixel points may be calculated and substituted into Equation (1) as D, so as to calculate L, which is a distance between the vehicle and the binocular camera.

Embodiment 1

Figure 1:
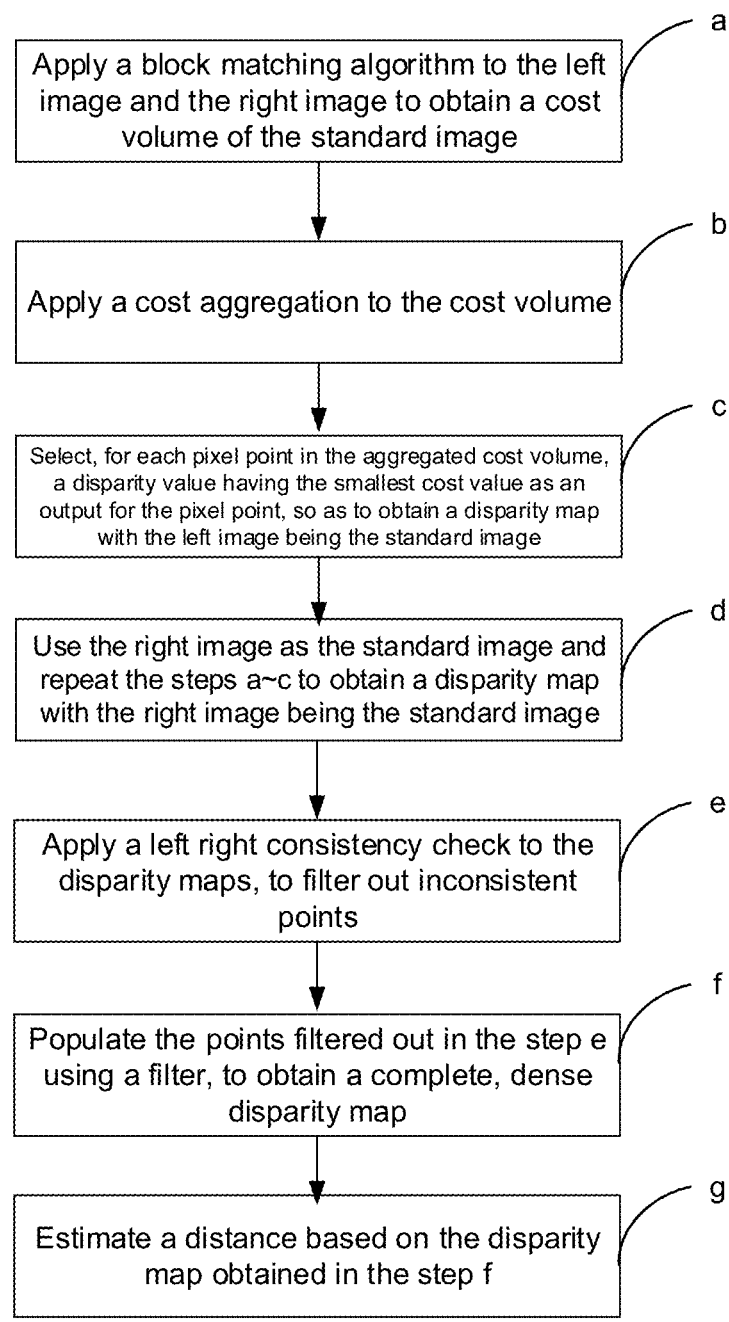
FIG. 1 is a flowchart illustrating a conventional binocular ranging algorithm.
Figure 2:
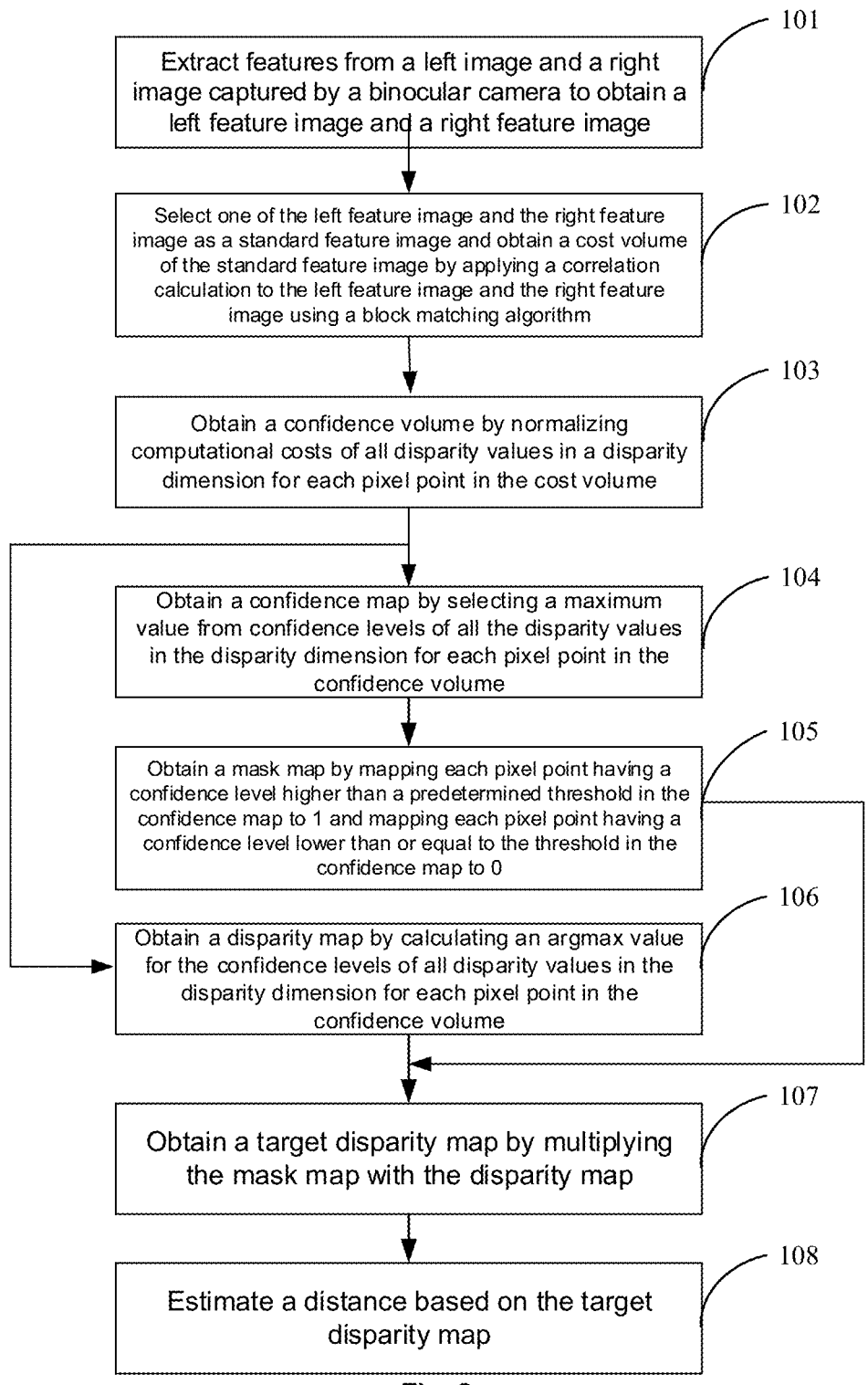
FIG. 2 is a flowchart illustrating a method for binocular ranging according to some embodiments of the present disclosure.

Referring to FIG. 2, which is a flowchart illustrating a method for binocular ranging according to some embodiments of the present disclosure, the method includes the following steps.

At step 101, features are extracted from a left image and a right image captured by a binocular camera to obtain a left feature image and a right feature image.

At step 102, one of the left feature image and the right feature image is selected as a standard feature image, and a cost volume of the standard feature image is obtained by applying a correlation calculation to the left feature image and the right feature image using a block matching algorithm.

At step 103, a confidence volume is obtained by normalizing computational costs of all disparity values in a disparity dimension for each pixel point in the cost volume.

At step 104, a confidence map is obtained by selecting a maximum value from confidence levels of all the disparity values in the disparity dimension for each pixel point in the confidence volume.

At step 105, a mask map is obtained by mapping each pixel point having a confidence level higher than a predetermined threshold in the confidence map to 1 and mapping each pixel point having a confidence level lower than or equal to the threshold in the confidence map to 0.

In some embodiments of the present disclosure, the value of the threshold may be set flexibly depending on actual requirements, e.g., to 0.5. The present disclosure is not limited to any specific value of the threshold.

At step 106, a disparity map is obtained by calculating an argmax value for the confidence levels of all disparity values in the disparity dimension for each pixel point in the confidence volume.

At step 107, a target disparity map is obtained by multiplying the mask map with the disparity map.

At step 108, a distance is estimated based on the target disparity map.

It can be appreciated by those skilled in the art that, with the target disparity map, pixel points corresponding to a target object in the left image may be determined using a target detection algorithm. The disparity values for the pixel points corresponding to the target object may be found in the target disparity map. Based on the disparity values for these pixel points, the distance between the target object and the binocular camera may be calculated using the above Equation (1).

In some embodiments of the present disclosure, the above steps 104 and 106 are not necessarily performed in any specific order. For example, the step 106 may be performed before the step 104, after the step 105 or in parallel with the step 104. The present disclosure is not limited to any specific order.

In some embodiments of the present disclosure, the step 101 may be, but not limited to be, implemented in any of the following schemes.

In Scheme A1, the left image and the right image are inputted sequentially to one convolutional neural network, which extracts features from the left image and the right image to obtain the left feature image and the right feature image.

In Scheme A2, the left image is inputted to a first predetermined convolutional neural network to obtain the left feature image, and the right image is inputted to a second predetermined convolutional neural network to obtain the right feature image. The first convolutional neural network and the second convolutional neural network are twin networks. Twin networks are two networks having identical structures and parameters and may be used in application scenarios such as binocular ranging and optical flow estimation.

In some embodiments of the present disclosure, the above convolutional neural network, first convolutional neural network and second convolutional neural network may each have a network structure like ResNet structure or VGG structure. This can be set flexibly by those skilled in the art depending on actual requirements and the present disclosure is not limited to any specific network structure.

Figure 3:
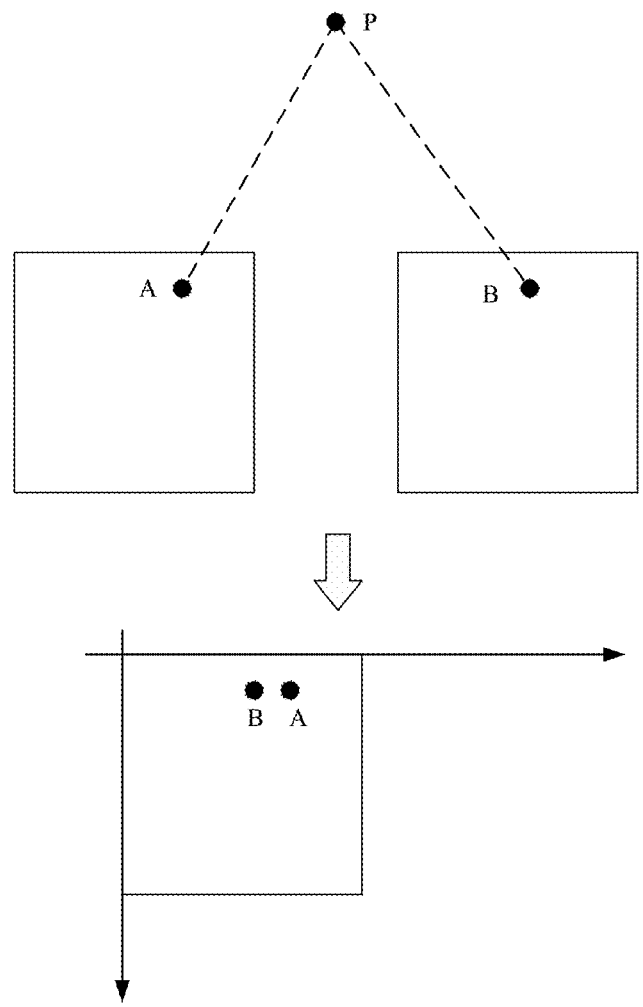
FIG. 3 is a schematic diagram showing a relationship between positions of one single point in a left image and a right image in a three-dimensional (3D) world according to some embodiments of the present disclosure.

In a 3D world, one single point has different positions in a left image and a right image captured by a binocular camera, with its position in the right image being to the left of its position in the left image. As shown in FIG. 3, assuming a point P in a 3D world, its position in the left image is at point A and its position in the right image is at point B. When the left and right images are arranged in one reference planar coordinate system, the point B will be to the left of the point A. Based on this principle, in the step 102 according to some embodiments of the present disclosure, the left feature image may be the standard feature image, the right feature image may be the reference feature image, and, based on coordinates of a pixel point in the left feature image, the reference feature image is searched, to the left of the pixel point, for a pixel point matched with the pixel point. Of course, alternatively, the right feature image may be the standard feature image, the left feature image may be the reference feature image, and, based on coordinates of a pixel point in the right feature image, the reference feature image is searched, to the right of the pixel point, for a pixel point matched with the pixel point.

The above step 102 may be, but not limited to be, implemented in the following scheme, which includes the following steps.

At step A, one of the left feature image and the right feature image is selected as the standard feature image and the other one is selected as a reference feature image.

At step B, the cost volume of the standard feature image is obtained by performing the following steps b1~b3 for each standard pixel point in the standard feature image.

At step b1, a number, d, of reference pixel points corresponding to the standard pixel point are selected from the reference feature image in a predetermined horizontal movement direction corresponding to the standard feature image based on coordinates of the standard pixel point in the reference feature image.

At step b2, an inner product between the standard pixel point and each reference pixel point corresponding to the standard pixel point is calculated, to obtain computational costs between the standard pixel point and the respective reference pixel points (a computational cost represents a similarity between two pixel points), and a correspondence between the computational costs and disparity values between the standard pixel point and the respective reference pixel points is created.

At step b3, the d computational costs are arranged in a disparity dimension of the standard pixel point in an ascending order of their corresponding disparity values, to obtain the cost volume of the standard feature image.

Of course, alternatively, in some embodiments of the present disclosure, the d computational costs may be arranged in the disparity dimension of the standard pixel point in a descending order of their corresponding disparity values. The present disclosure is not limited to any specific order in which the d computational costs are arranged in the disparity dimension of the standard pixel point.

Figure 4A:
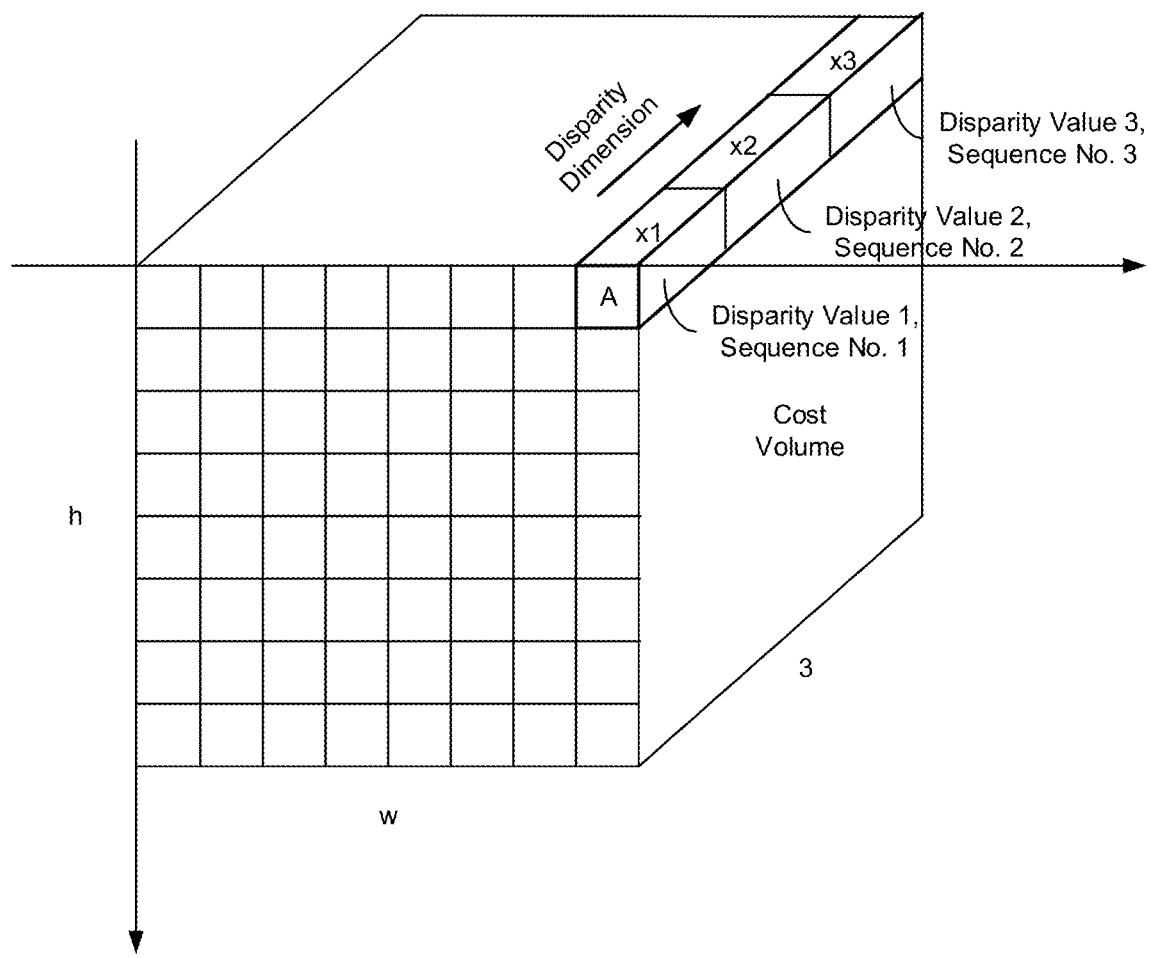
FIG. 4A is a schematic diagram showing a cost volume according to some embodiments of the present disclosure.

Assuming that a standard pixel point A corresponds to reference pixel points A1, A2 and A3, the disparity values between the standard pixel point A and the reference pixel points A1, A2 and A3 are 1, 2 and 3, respectively, and the computational costs between the standard pixel point A and the reference pixel points A1, A2 and A3 are x1, x2 and x3, respectively, a correspondence between the disparity values and the computational costs may be created as follows: the disparity value 1 corresponds to the computational cost x1, the disparity value 2 corresponds to the computational cost x2, and the disparity value 3 corresponds to the computational cost x3. The computational costs x1, x2 and x3 are arranged in a disparity dimension of the standard pixel point A in an ascending order of their corresponding disparity values. The computational costs x1, x2 and x3 have sequence numbers of 1, 2 and 3, respectively, in the disparity dimension, as shown in FIG. 4A.

In some embodiments of the present disclosure, in the above step 103, the computational costs of the disparity values in the disparity dimension for each pixel point are normalized to obtain confidence levels corresponding to the respective disparity values. In the example of FIG. 4A, the computational costs x1, x2 and x3 corresponding to the respective disparity values 1, 2 and 3 for the standard pixel point A may be normalized to obtain confidence levels y1, y2 and y3 corresponding to the respective disparity values 1, 2 and 3, i.e., to obtain the confidence volume as shown in FIG. 4B.

Figure 4B:
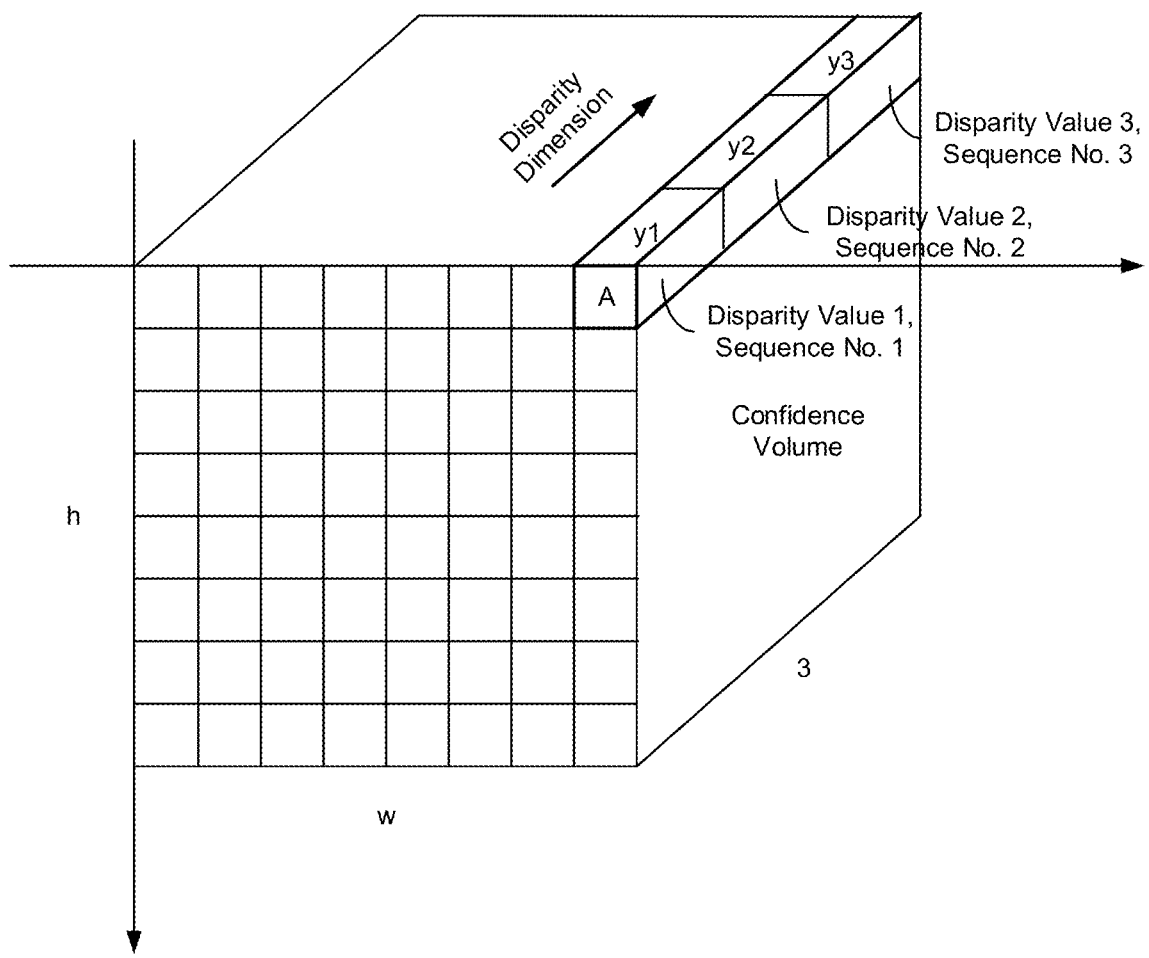
FIG. 4B is a schematic diagram showing a confidence volume according to some embodiments of the present disclosure.
Figure 4C:
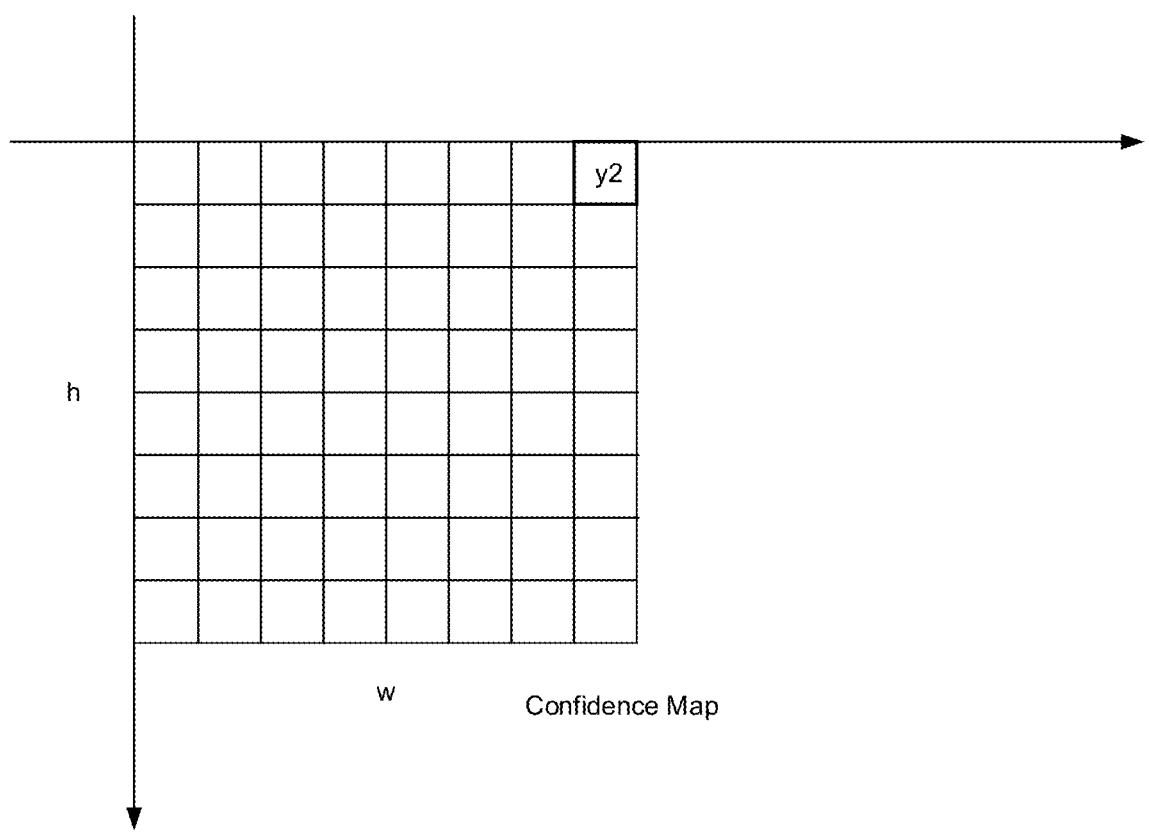
FIG. 4C is a schematic diagram showing a confidence map according to some embodiments of the present disclosure.

In some embodiments of the present disclosure, in the above step 104, in the example of FIG. 4B, a maximum value is selected from the confidence levels y1, y2 and y3 of the respective disparity values 1, 2 and 3 in the disparity dimension for the standard pixel point. Assuming that y2 is the largest, i.e., max (y1, y2, y3)=y2, a two-dimensional confidence map as shown in FIG. 4C may be obtained.

Figure 4D:
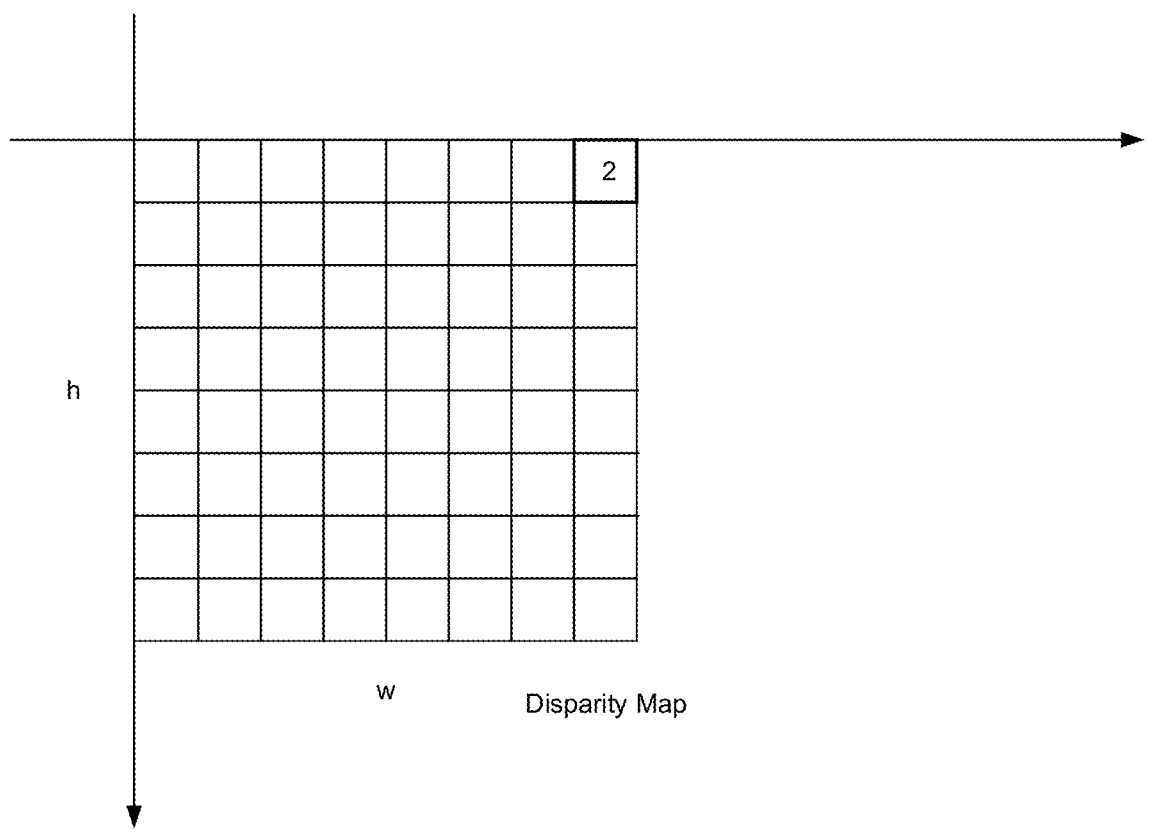
FIG. 4D is a schematic diagram showing a disparity map according to some embodiments of the present disclosure.

In some embodiments of the present disclosure, in the above step 106, in the example of FIG. 4B, an argmax value is calculated for the confidence levels of the respective disparity values 1, 2 and 3 for the standard pixel point A. Assuming that y2 is the largest and the sequence number corresponding to y2 is 2, i.e., argmax (y1, y2, y3)=2, a two-dimensional disparity map as shown in FIG. 4D may be obtained.

In some embodiments of the present disclosure, the horizontal movement direction is horizontally leftward when the standard feature image is the left feature image, or horizontally rightward when the standard feature image is the right feature image.

In some embodiments of the present disclosure, the step b1 may be, but not limited to be, implemented in any of the following schemes.

In Scheme B1, in the reference feature image, based on the coordinates of the standard pixel point, a movement by a predetermined step length is made each time for d times in the horizontal movement direction, to obtain one reference pixel point corresponding to the standard pixel point each time.

Figure 5A:
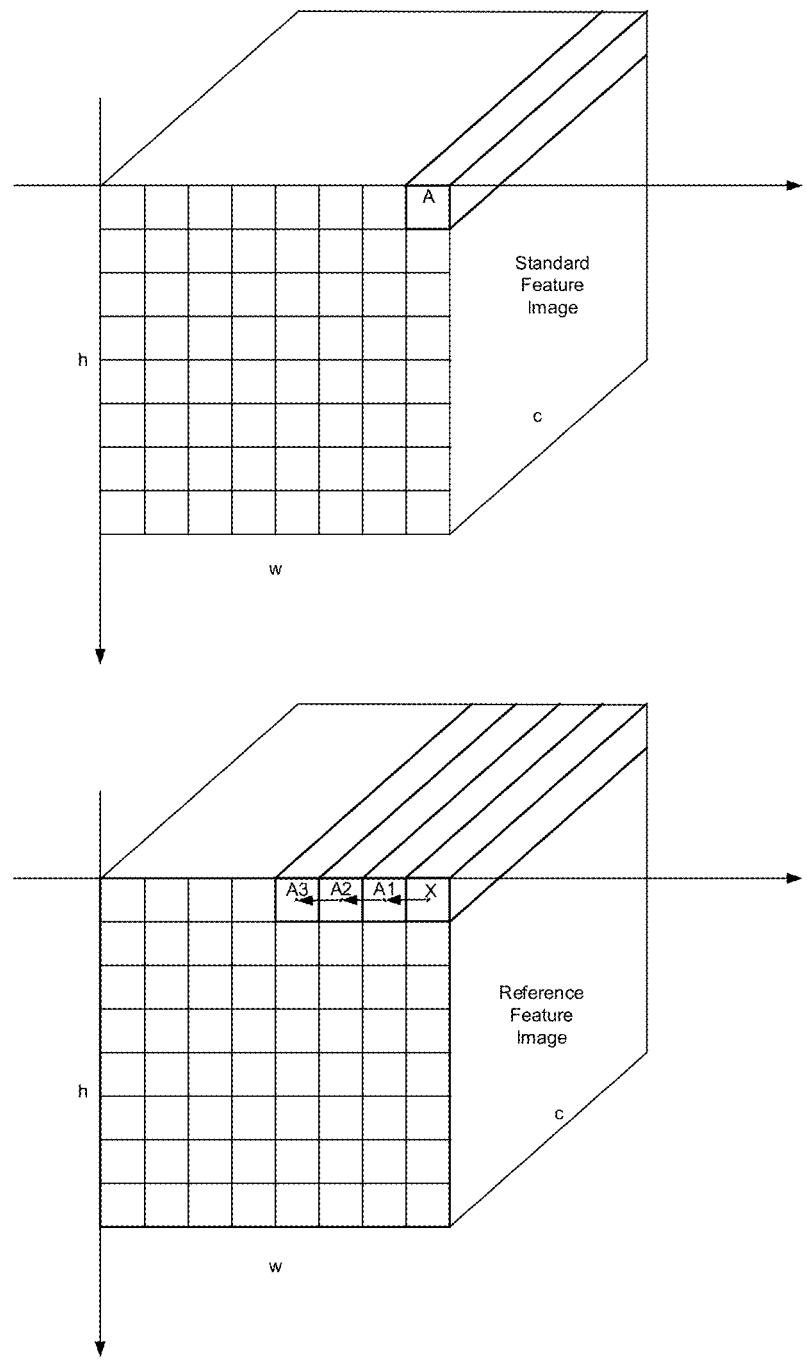
FIGS. 5A, 5B, 5C and 5D are schematic diagrams each showing how to find reference pixel points corresponding to a standard pixel point in a reference feature image according to some embodiments of the present disclosure.
Figure 5B:
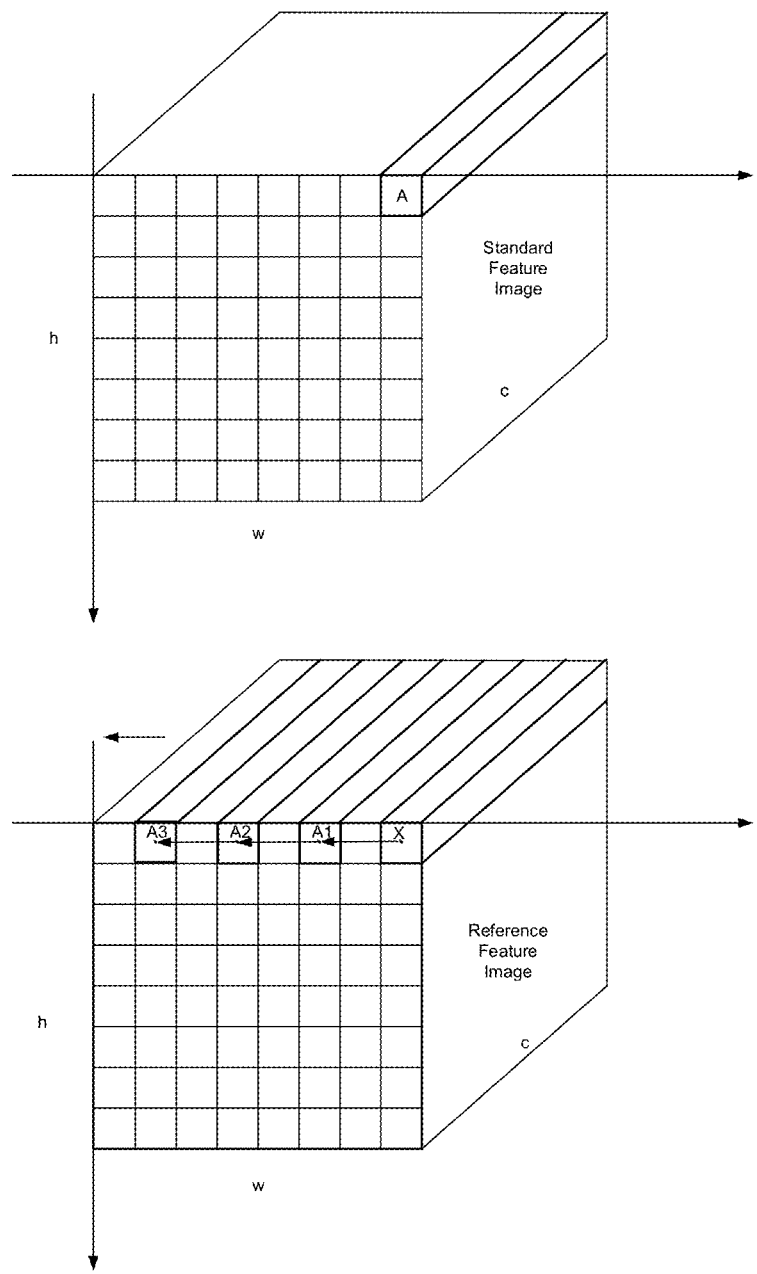

That is, in Scheme B1, based on each current reference pixel point, a movement by the step length is made in the horizontal movement direction to obtain the next reference pixel point, until the total number of movements reaches d. In some embodiments of the present disclosure, the step length may be set as a multiple of a distance between two neighboring pixel points. Assuming that the step length is set as the distance between two neighboring pixel points and the left feature image is the standard feature image, for a standard pixel point A in the left feature image, reference pixel points A1, A2 and A3 corresponding to the standard pixel point A may be found in the reference feature image in accordance with Scheme B1. The disparity values between the standard pixel point A and the respective reference pixel points A1, A2 and A3 are 1, 2 and 3 (a disparity value of n represents a disparity of n pixels), as shown in FIG. 5A, where the pixel point X is a pixel point in the reference feature image that has the same coordinates as the standard pixel point. The same also applies to the case where the right feature image is the standard feature image and details thereof will be omitted here. Assuming that the step length is set as twice the distance between two neighboring pixel points and the left feature image is the standard feature image, for a standard pixel point A in the left feature image, reference pixel points A1, A2 and A3 corresponding to the standard pixel point A may be found in the reference feature image in accordance with Scheme B1. The disparity values between the standard pixel point A and the respective reference pixel points A1, A2 and A3 are 2, 4 and 6 (a disparity value of n represents a disparity of n pixels), as shown in FIG. 5B, where the pixel point X is a pixel point in the reference feature image that has the same coordinates as the standard pixel point. The same also applies to the case where the right feature image is the standard feature image and details thereof will be omitted here. The step length can be set flexibly by those skilled in the art depending on actual requirements and the present disclosure is not limited to any specific step length.

In Scheme B2, in the reference feature image, based on the coordinates of the standard pixel point, a number of consecutive pixel points are selected in the horizontal movement direction, as the number of reference pixel points corresponding to the standard pixel point.

Figure 5C:
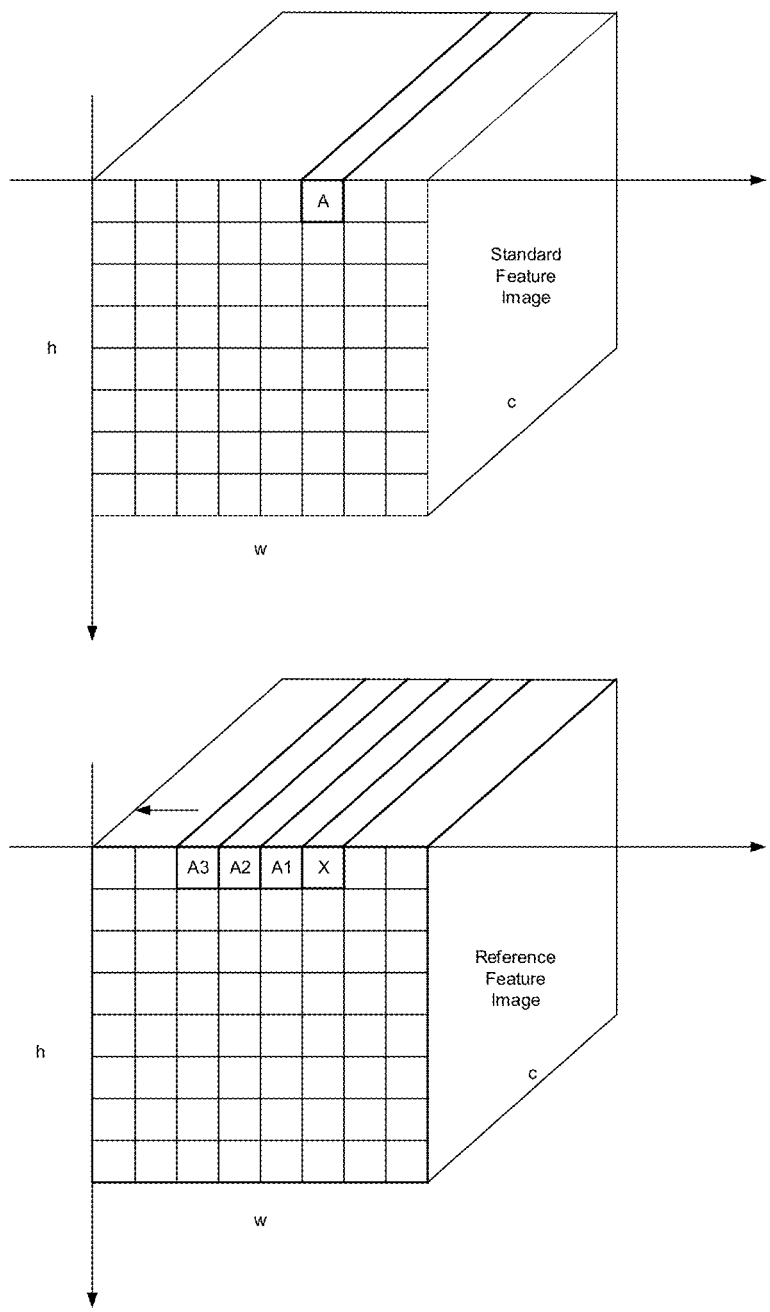
Figure 5D:
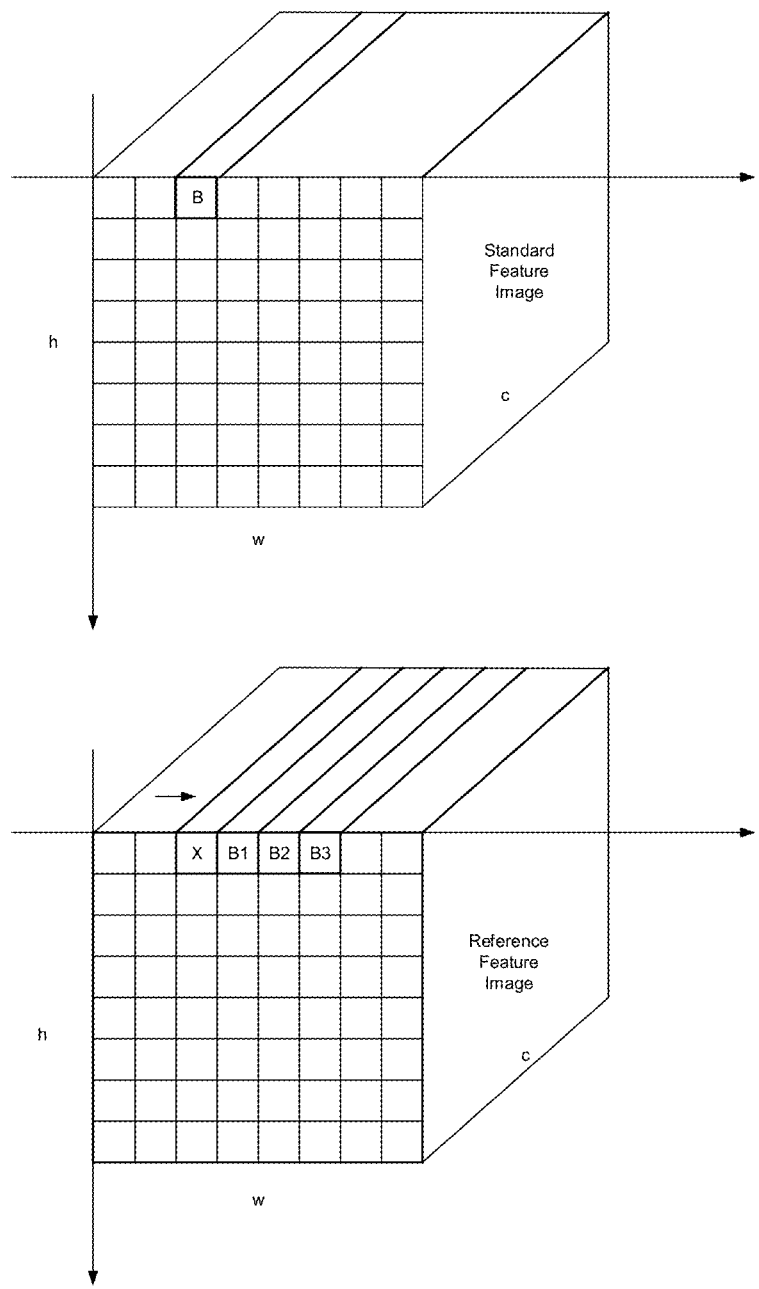

That is, in Scheme B2, starting from the pixel point in the reference feature image that has the same coordinates as the standard pixel point, d consecutive pixel points in the horizontal movement direction are selected directly as the reference pixel points corresponding to the standard pixel point. Assuming that the left feature image is the standard feature image, for a standard pixel point A in the left feature image, the pixel point in the right feature image that has the same coordinates as the standard pixel point A is X, three consecutive pixel points A1, A2 and A3 to the left of the pixel point X are selected as the reference pixel points corresponding to the standard pixel point A, as shown in FIG. 5C. Assuming that the right feature image is the standard feature image, for a standard pixel point B in the right feature image, the pixel point in the left feature image that has the same coordinates as the standard pixel point B is X, three consecutive pixel points B1, B2 and B3 to the right of the pixel point X are selected as the reference pixel points corresponding to the standard pixel point B, as shown in FIG. 5D.

In some embodiments of the present disclosure, d is a predetermined movement range (i.e., maximum search range, representing the maximum disparity value). The value of d may be an empirical value and may be set flexibly by those skilled in the art depending on actual requirements. The present disclosure is not limited to any specific value of d.

In order to facilitate understanding of the solutions by those skilled in the art, in the following, a solution for obtaining a cost volume with the left feature image being the standard feature image will be described in detail with reference to Example 1, and a solution for obtaining a cost volume with the right feature image being the standard feature image will be described in detail with reference to Example 2.

In Example 1 and Example 2, it is assumed that a left image and a right image are captured by a binocular camera at the same time, denoted as $P_L$ and $P_R$, respectively. Features are extracted from $P_L$ and $P_R$ using twin networks, respectively, to obtain a left feature image, denoted as $F^L$, and a right feature image, denoted as $F^R$. Here, $F^L$, $F^R \in R^{(h \times w \times c)}$, where h, w and c are the height, width and number of features of the feature images. In the following, two examples will be given for explaining in detail the above Scheme B1 and Scheme B2 for obtaining the cost volume.

Example 1

The left feature image is the standard feature image and the right feature image is the reference feature image. The movement range is set to d, the horizontal movement direction is horizontally leftward, and the step length is set to the distance between two neighboring pixel points. The pixel points in the standard feature image are referred to as standard pixel points, and the pixel points in the reference feature image are referred to as reference pixel points. For each standard pixel point in the left feature image, the following steps 1a~3a are performed to obtain a cost volume. For a standard pixel point A as an example, the steps 1a–3a are performed as follows.

At step 1a, in the right feature image, based on the coordinates of the standard pixel point A, a movement to the left is made to obtain a reference pixel point A1 in the right feature image, based on the previous reference pixel point A1, a further movement to the left is made to obtain a reference pixel point A2; in the right feature image, based on the previous reference pixel point Ad−1, a further movement to the left is made to obtain a reference pixel point Ad. In this way, d reference pixel points, A1, A2, . . . , Ad, corresponding to the standard pixel point A may be determined in the right feature image.

Figure 6:
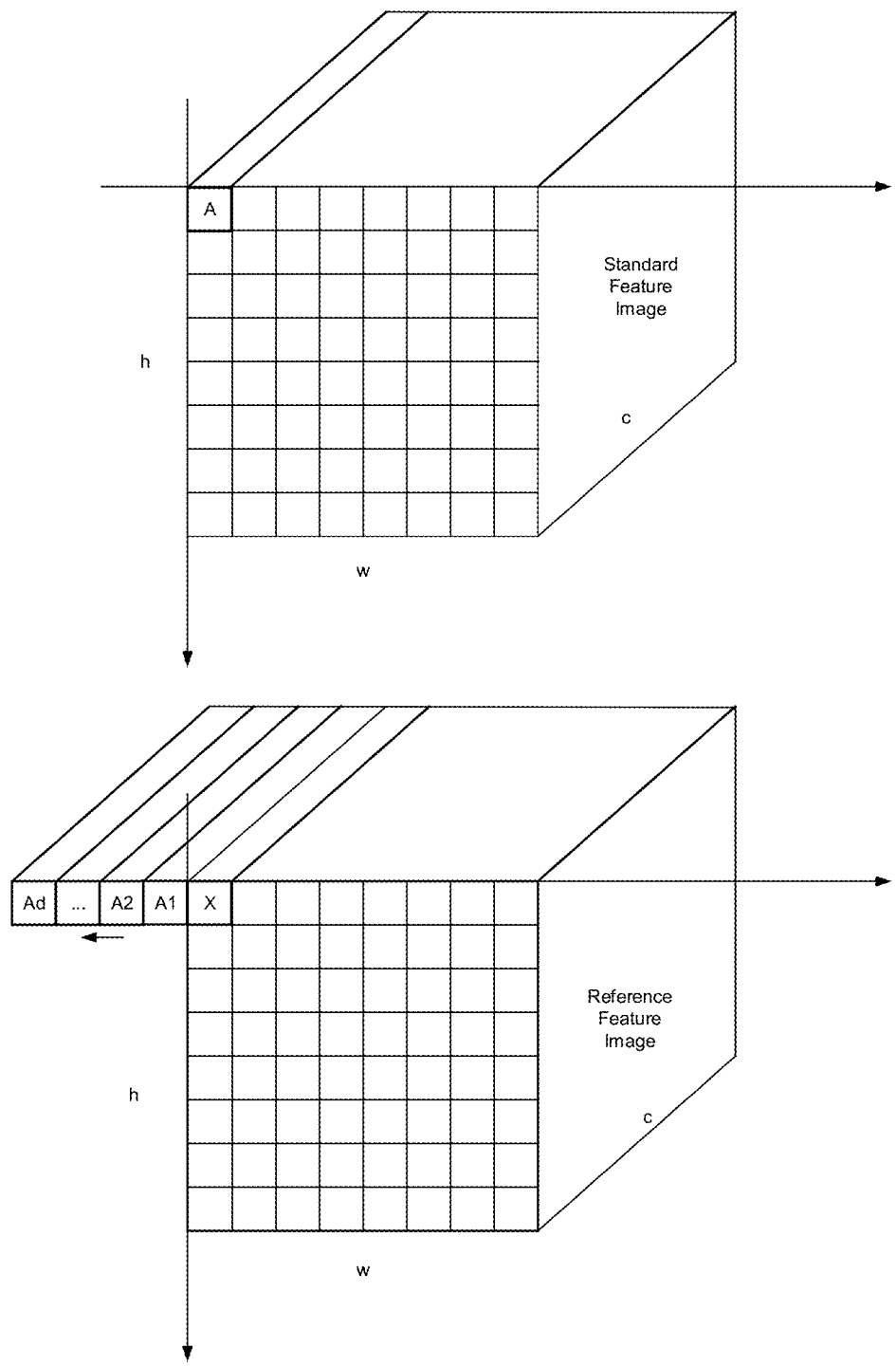
FIG. 6 is a schematic diagram showing how to populate virtual reference pixel points in a reference feature image, with a left feature image being a standard feature image, according to some embodiments of the present disclosure.

Of course, in the step 1a, for the leftmost d consecutive standard pixel points in each row in the left feature image, not all the d corresponding reference pixel points can be found in the right feature image. In this case, some virtual reference pixel points may be provided in the right feature image for these standard pixel points. For the pixels in a particular row in the left feature image, from left to right: for the first standard pixel point, d consecutive virtual reference pixel points need to be provided at the left end of the corresponding row in the right feature image; for the second standard pixel point, d−1 consecutive virtual reference pixel points need to be provided at the left end of the corresponding row in the right feature image; for the third standard pixel point, d−2 consecutive virtual reference pixel points need to be provided at the left end of the corresponding row in the right feature image; in this way, for the d-th standard pixel point, 1 virtual reference pixel point needs to be provided at the left end of the corresponding row in the right feature image. From the (d+1)-th standard pixel point on, no virtual reference pixel point is needed in the corresponding row. As shown in FIG. 6, for the first standard pixel point A in the first row in the left feature image, d virtual reference pixel points, A1, A2, . . . , Ad, are provided at the leftmost end of the first row in the right feature image.

At step 2a, inner product operations are performed sequentially between the standard pixel point A and the respective d reference pixel points, to obtain computational costs between the standard pixel point A and the respective d reference pixel points. Assuming that any feature of the standard pixel point A is denoted as $F_{x,y}^L$, $F_{x,y}^L \in R^c$, d inner products between the standard pixel point A and the respective reference pixel points A1, A2, . . . , Ad are calculated as C_(x,y,1), C_(x,y,2), . . . , C_(x,y,d), where C_(x,y,i)=<$F_{x,y}^L, F_{x-i,y}^L$> and <.,.> denotes inner product operation.

At step 3a, the d computational costs are arranged in the disparity dimension of the standard pixel point A in an ascending order of their corresponding disparity values.

Of course, some alternative solutions can be used by those skilled in the art. For example, the above step 1a and step 2a may be combined, such that for each movement to the left to obtain a reference pixel point, the inner product operation between the standard pixel point and the reference pixel point may be performed before the next movement to the left.

Example 2

The right feature image is the standard feature image and the left feature image is the reference feature image. The movement range is set to d, the horizontal movement direction is horizontally rightward, and the step length is set to the distance between two neighboring pixel points. The pixel points in the standard feature image are referred to as standard pixel points, and the pixel points in the reference feature image are referred to as reference pixel points. For each standard pixel point in the right feature image, the following steps 1b-3b are performed to obtain a cost volume. For a standard pixel point B as an example, the steps 1b-3b are performed as follows.

At step 1b, in the left feature image, based on the coordinates of the standard pixel point B, a movement to the right is made to obtain a reference pixel point B1, in the left feature image, based on the previous reference pixel point B1, a further movement to the right is made to obtain a reference pixel point B2; in the left feature image, based on the previous reference pixel point Bd−1, a further movement to the right is made to obtain a reference pixel point Bd. In this way, d reference pixel points, B1, B2, . . . , Bd, corresponding to the standard pixel point B may be determined in the left feature image.

Figure 7:
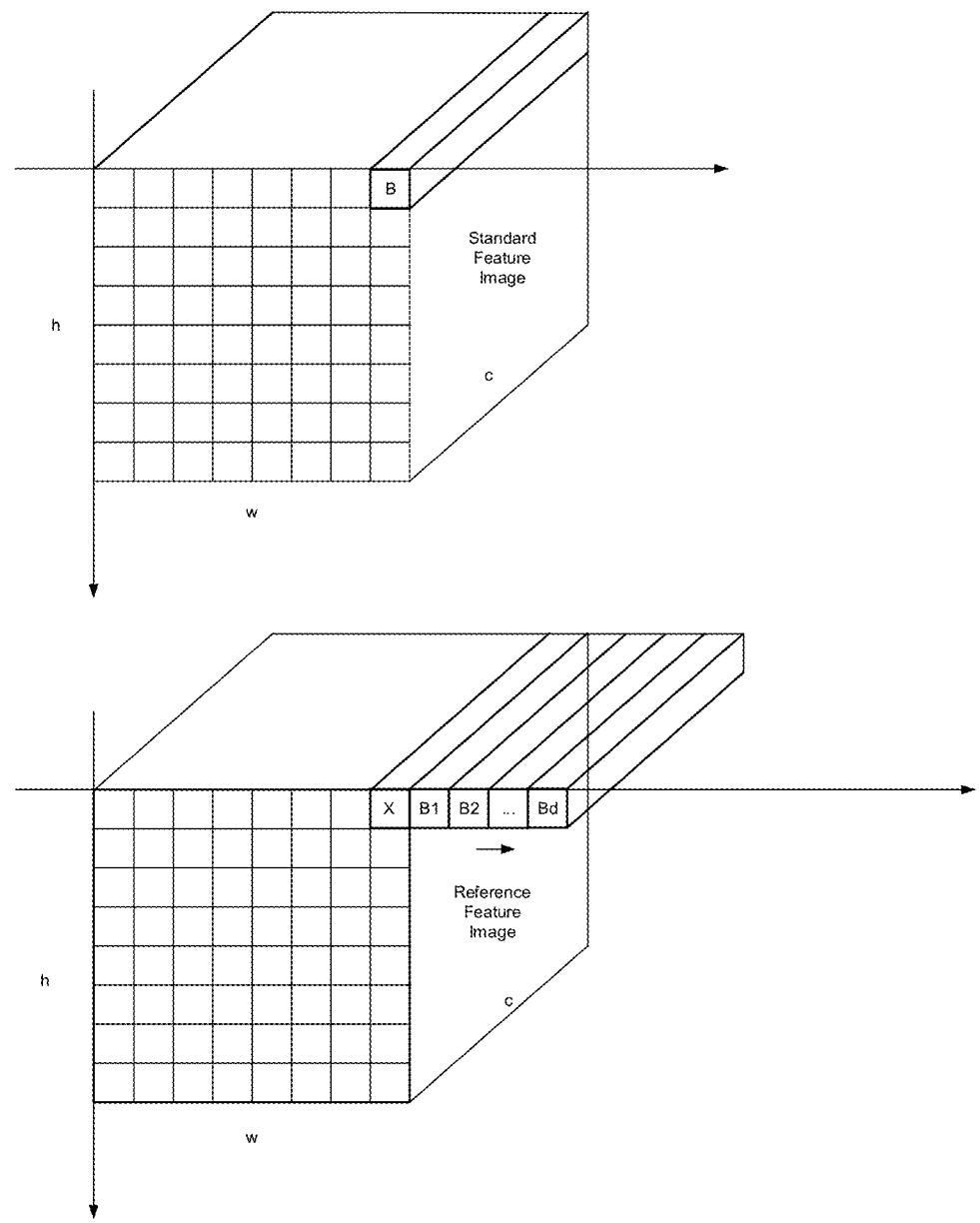
FIG. 7 is a schematic diagram showing how to populate virtual reference pixel points in a reference feature image, with a right feature image being a standard feature image, according to some embodiments of the present disclosure.

Of course, in the step 1b, for the rightmost d consecutive standard pixel points in each row in the right feature image, not all the d corresponding reference pixel points can be found in the left feature image. In this case, some virtual reference pixel points may be provided in the left feature image for these standard pixel points. For the pixels in a particular row in the right feature image, from right to left: for the first standard pixel point, d consecutive virtual reference pixel points need to be provided at the right end of the corresponding row in the left feature image; for the second standard pixel point, d−1 consecutive virtual reference pixel points need to be provided at the right end of the corresponding row in the left feature image; for the third standard pixel point, d−2 consecutive virtual reference pixel points need to be provided at the right end of the corresponding row in the left feature image; in this way, for the d-th standard pixel point, 1 virtual reference pixel point needs to be provided at the right end of the corresponding row in the left feature image. From the (d+1)-th standard pixel point on, no virtual reference pixel point is needed in the corresponding row. As shown in FIG. 7, for the first standard pixel point B in the first row in the right feature image, d virtual reference pixel points, B1, B2, . . . , Bd, are provided at the rightmost end of the first row in the left feature image.

In some embodiment of the present disclosure, each virtual reference pixel point may be set to a pixel point having a value of 0.

At step 2b, inner product operations are performed sequentially between the standard pixel point B and the respective d reference pixel points, to obtain computational costs between the standard pixel point B and the respective d reference pixel points. Assuming that any feature of the standard pixel point B is denoted as $F_{x,y}^L$, $F_{x,y}^L \in R^c$, d inner products between the standard pixel point B and the respective reference pixel points B1, B2, . . . , Bd are calculated as C_(x,y,1), C_(x,y,2), . . . , C_(x,y,d), where C_(x,y,i)=<$F_{x,y}^L, F_{x-i,y}^L$> and <.,.> denotes inner product operation.

At step 3b, the d computational costs are arranged in the disparity dimension of the standard pixel point B in an ascending order of their corresponding disparity values.

Of course, some alternative solutions can be used by those skilled in the art. For example, the above step 1b and step 2b may be combined, such that for each movement to the right to obtain a reference pixel point, the inner product operation between the standard pixel point and the reference pixel point may be performed before the next movement to the right.

Preferably, in some embodiments of the present disclosure, in the above step 103, the computational costs of all the disparity values in the disparity dimension for each pixel point in the cost volume may be normalized using a softmax function, to obtain confidence levels of the respective disparity values in the disparity dimension for each pixel point and thus the confidence volume. A softmax value is a confidence level.

In some embodiments of the present disclosure, the softmax function refers to a function capable of normalizing values in a vector and representing them in form of probabilities. Mathematically, the softmax function can be represented as:

$$\text{Softmax}(x)_j = \frac{e^{xj}}{\sum_{k=1}^{K} e^{xk}}, \text{ for } j = 1, 2, \ldots, K. \quad (2)$$

Figure 8:
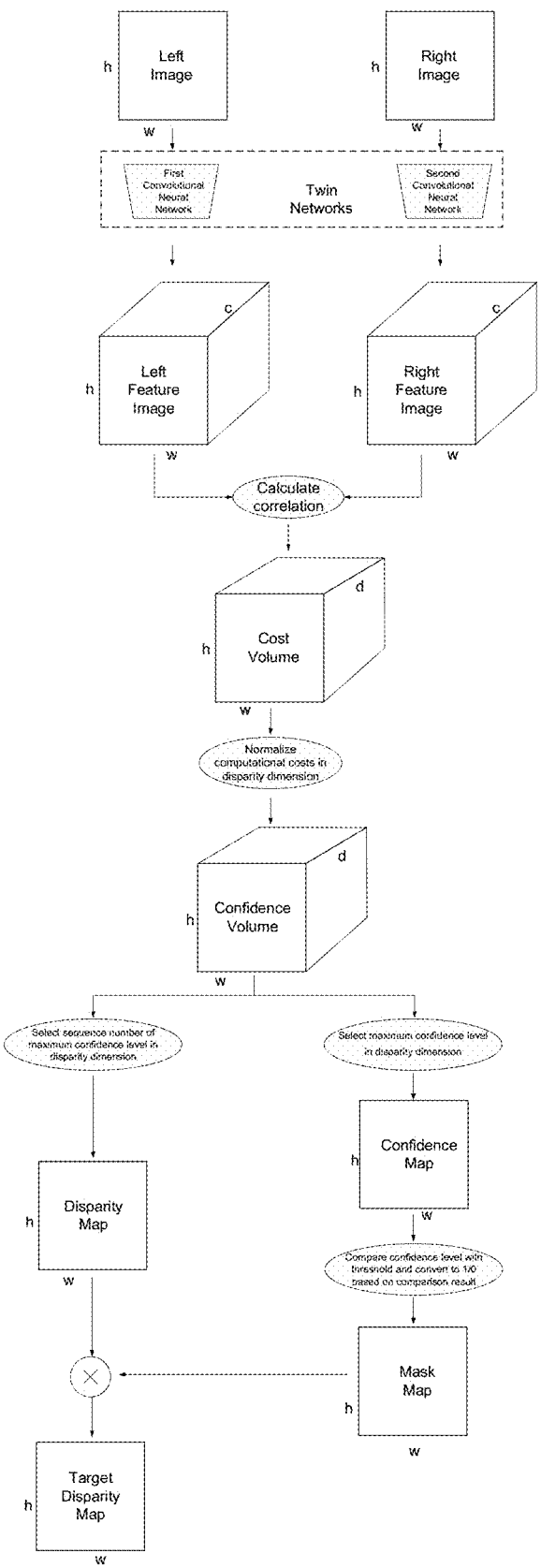
FIG. 8 is a schematic diagram showing one of processes for distance estimation using the method shown in FIG. 2 according to some embodiments of the present disclosure.

FIG. 8 is a schematic diagram showing one of processes for distance estimation using the method shown in FIG. 2. A left image and a right image are captured by a binocular camera at the same time, denoted as $P_L$ and $P_R$, respectively. Features are extracted from the left image and the right image using twin networks, respectively, to obtain a left feature image, denoted as $F^L$, and a right feature image, denoted as $F^R$. Here, $F^L$, $F^R \in R^{(h \times w \times c)}$, where h, w and c are the height, width and number of features of the feature images. A correlation between the left feature image and the right feature image is calculated using a matching algorithm, to obtain a cost volume $C \in R^{(h \times w \times d)}$, where h, w and c are the height, width and number of computational costs in the disparity dimension of the cost volume. The computational costs of all disparity values in a disparity dimension for each pixel point in the cost volume are normalized, to obtain a confidence volume $Z \in R^{(h \times w \times d)}$. Two branches of processes are applied to the confidence volume. In a first branch, a maximum value is selected from confidence levels of all the disparity values in the disparity dimension for each pixel point in the confidence volume, to obtain a confidence map, then each pixel point having a confidence level higher than a predetermined threshold in the confidence map is mapped to 1, and each pixel point having a confidence level lower than or equal to the threshold in the confidence map is mapped to 0, to obtain a mask map. In a second branch, an argmax value is calculated for the confidence levels of all disparity values in the disparity dimension for each pixel point in the confidence volume using an argmax function (i.e., selecting the sequence number of the maximum confidence level in the disparity dimension), to obtain a complete, dense disparity map which contains some pixel points having low confidence levels or matching errors. The mask map obtained in the first branch is multiplied with the disparity map obtained in the second branch to filter out those pixel points having low confidence levels or matching errors in the disparity map, so as to obtain a target disparity map. Finally, a distance may be estimated based on the target disparity map.

In some embodiments of the present disclosure, the first convolutional neural network and the second convolutional neural network may be formed as an integrated network, which may be trained in an end-to-end manner. In training the network, the entire algorithm may operate until the confidence volume is outputted. The training of the entire network may be considered as a training for executing a classification task for each pixel point.

Embodiment 2

Based on the same concept as the method for binocular ranging according to the above Embodiment 1, in some embodiments of the present disclosure, an apparatus for binocular ranging is provided. The apparatus has a structure shown in FIG. 9, including a feature extraction unit 11, a cost volume generation unit 12, a confidence volume generation unit 13, a confidence map generation unit 14, a mask map generation unit 15, a disparity map generation unit 16, a target disparity map generation unit 17 and a ranging unit 18.

The feature extraction unit 11 may be configured to extract features from a left image and a right image captured by a binocular camera to obtain a left feature image and a right feature image.

The cost volume generation unit 12 may be configured to select one of the left feature image and the right feature image as a standard feature image, and obtain a cost volume of the standard feature image by applying a correlation calculation to the left feature image and the right feature image using a block matching algorithm.

The confidence volume generation unit 13 may be configured to obtain a confidence volume by normalizing computational costs of all disparity values in a disparity dimension for each pixel point in the cost volume.

The confidence map generation unit 14 may be configured to obtain a confidence map by selecting a maximum value from confidence levels of all the disparity values in the disparity dimension for each pixel point in the confidence volume.

The mask map generation unit 15 may be configured to obtain a mask map by mapping each pixel point having a confidence level higher than a predetermined threshold in the confidence map to 1 and mapping each pixel point having a confidence level lower than or equal to the threshold in the confidence map to 0.

The disparity map generation unit 16 may be configured to obtain a disparity map by calculating an argmax value for the confidence levels of all disparity values in the disparity dimension for each pixel point in the confidence volume.

The target disparity map generation unit 17 may be configured to obtain a target disparity map by multiplying the mask map with the disparity map.

The ranging unit 18 may be configured to estimate a distance based on the target disparity map.

In a specific implementation, the feature extraction unit 11 may be configured to input the left image to a first predetermined convolutional neural network to obtain the left feature image, and input the right image to a second predetermined convolutional neural network to obtain the right feature image. The first convolutional neural network and the second convolutional neural network are twin networks. For details of this implementation, reference can be made to Scheme A2 in Embodiment 1 and description thereof will be omitted.

Of course, in an alternative implementation, the feature extraction unit 11 may be configured to input the left image and the right image sequentially to one convolutional neural network, which extracts features from the left image and the right image to obtain the left feature image and the right feature image.

Figure 10:
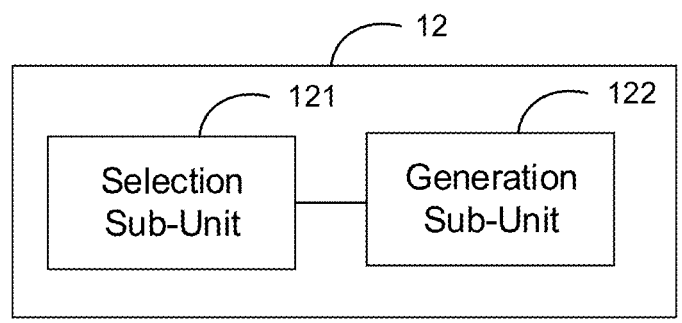
FIG. 10 is a schematic diagram showing a structure of a cost volume generation unit according to some embodiments of the present disclosure.

In some embodiments, the cost volume generation unit 12 may have a structure shown in FIG. 10, including a selection sub-unit 121 and a generation sub-unit 122.

The selection sub-unit 121 may be configured to select one of the left feature image and the right feature image as the standard feature image and the other one as a reference feature image.

The generation sub-unit 122 may be configured to obtain the cost volume of the standard feature image by, for each standard pixel point in the standard feature image: selecting from the reference feature image a number, d, of reference pixel points corresponding to the standard pixel point in a predetermined horizontal movement direction corresponding to the standard feature image based on coordinates of the standard pixel point in the reference feature image; calculating an inner product between the standard pixel point and each reference pixel point corresponding to the standard pixel point to obtain computational costs between the standard pixel point and the respective reference pixel points, and creating a correspondence between the computational costs and disparity values between the standard pixel point and the respective reference pixel points; and arranging the d computational costs in a disparity dimension of the standard pixel point in an ascending order of their corresponding disparity values, to obtain the cost volume of the standard feature image.

In some embodiments, the generation sub-unit 122 may select from the reference feature image the number, d, of reference pixel points corresponding to the standard pixel point in the predetermined horizontal movement direction corresponding to the standard feature image based on the coordinates of the standard pixel point in the reference feature image in accordance with any of the following non-limiting schemes.

In Scheme C1, a movement by a predetermined step length is made each time for d times in the horizontal movement direction based on the coordinates of the standard pixel point in the reference feature image, to obtain one reference pixel point corresponding to the standard pixel point each time. Scheme C1 corresponds to Scheme B1 in Embodiment 1 and details thereof will be omitted here.

In Scheme C2, d consecutive pixel points are selected in the horizontal movement direction based on the coordinates of the standard pixel point in the reference feature image, as the d reference pixel points corresponding to the standard pixel point. Scheme C2 corresponds to Scheme B2 in Embodiment 1 and details thereof will be omitted here.

In some embodiments of the present disclosure, the horizontal movement direction is horizontally leftward when the standard feature image is the left feature image, or horizontally rightward when the standard feature image is the right feature image.

In some embodiments, the confidence volume generation unit 13 may be configured to: normalize the computational costs of all the disparity values in the disparity dimension for each pixel point in the cost volume using a softmax function, to obtain confidence levels of the respective disparity values in the disparity dimension for each pixel point and thus the confidence volume.

Figure 9:
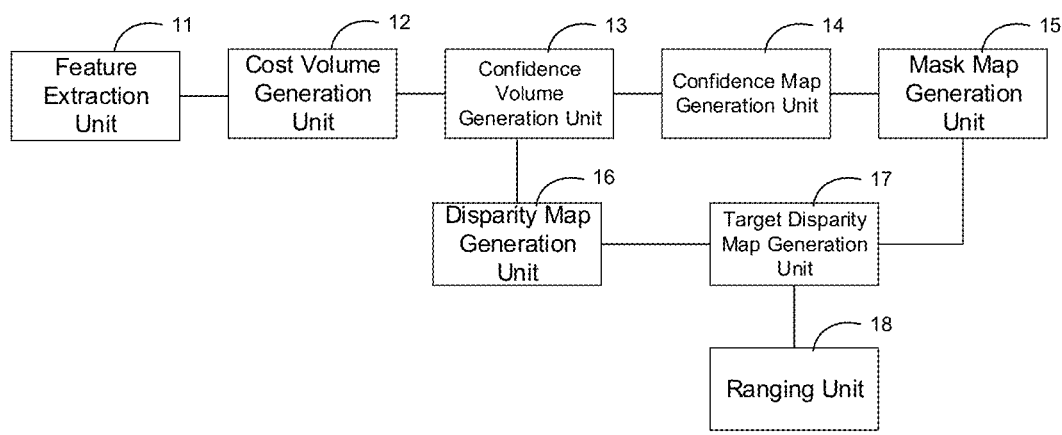
FIG. 9 is a schematic diagram showing a structure of an apparatus for binocular ranging according to some embodiments of the present disclosure.

In some embodiments of the present disclosure, the above apparatus shown in FIG. 9 may run on a processor, such as a Central Processing Unit (CPU), of a Digital Signal Processor (DSP), a Field-Programmable Gate Array (FPGA) controller, an industrial computer, a vehicle computer, an Electronic Control Unit (ECU) or a Vehicle Control Unit (VCU).

Embodiment 3

Figure 11:
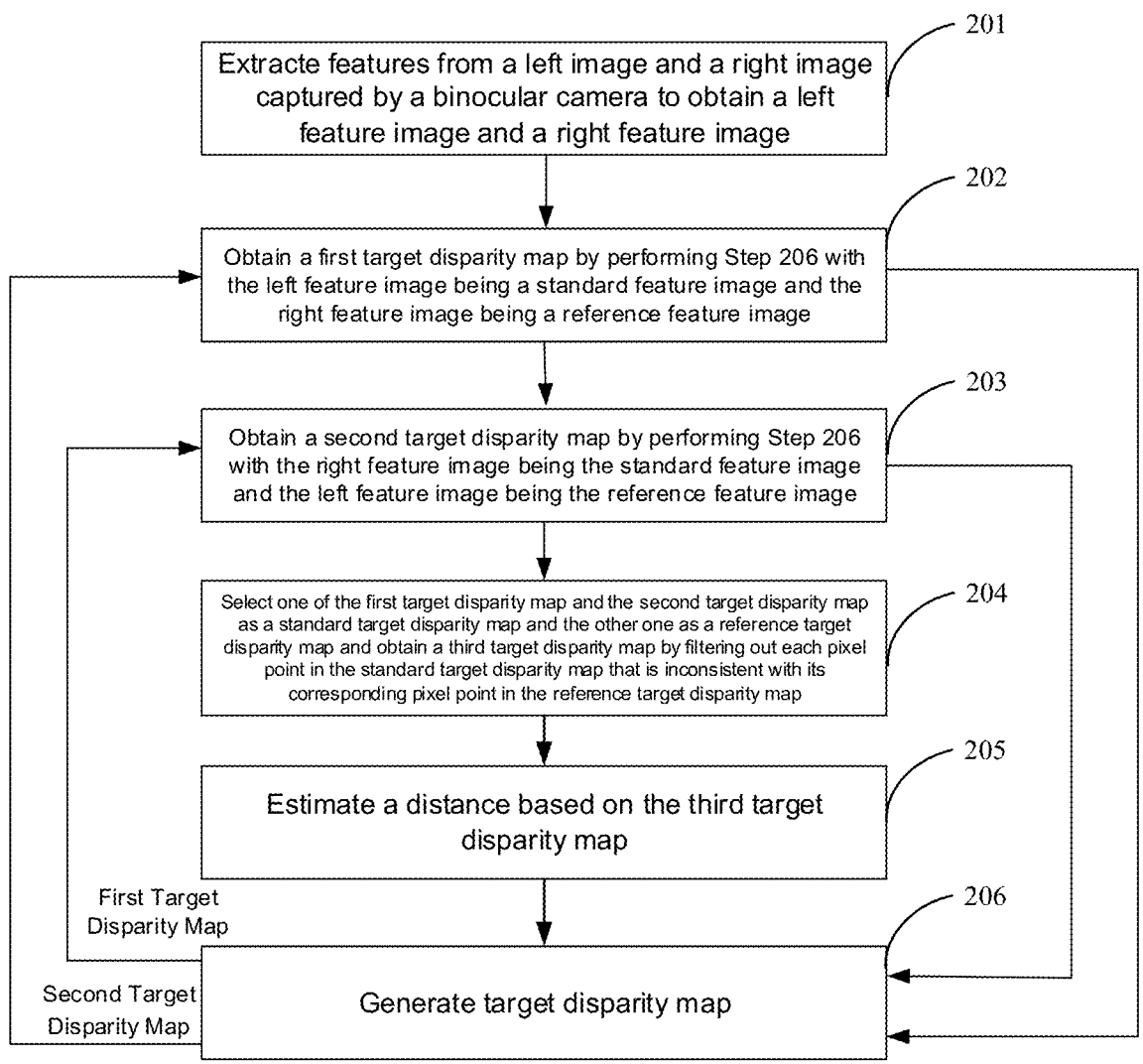
FIG. 11 is a flowchart illustrating a method for binocular ranging according to some other embodiments of the present disclosure.

Based on the same concept as the method for binocular ranging according to the above Embodiment 1, according to Embodiment 3 of the present disclosure, another method for binocular ranging is provided. The process flow of the method is shown in FIG. 11, including the following steps.

At step 201, features are extracted from a left image and a right image captured by a binocular camera to obtain a left feature image and a right feature image.

At step 202, a first target disparity map is obtained by performing Step 206 with the left feature image being a standard feature image and the right feature image being a reference feature image.

At step 203, a second target disparity map is obtained by performing Step 206 with the right feature image being the standard feature image and the left feature image being the reference feature image.

At step 204, one of the first target disparity map and the second target disparity map is selected as a standard target disparity map and the other one is selected as a reference target disparity map, and a third target disparity map is obtained by filtering out each pixel point in the standard target disparity map that is inconsistent with its corresponding pixel point in the reference target disparity map.

At step 205, a distance is estimated based on the third target disparity map.

At step 206, a target disparity map is generated.

Figure 12:
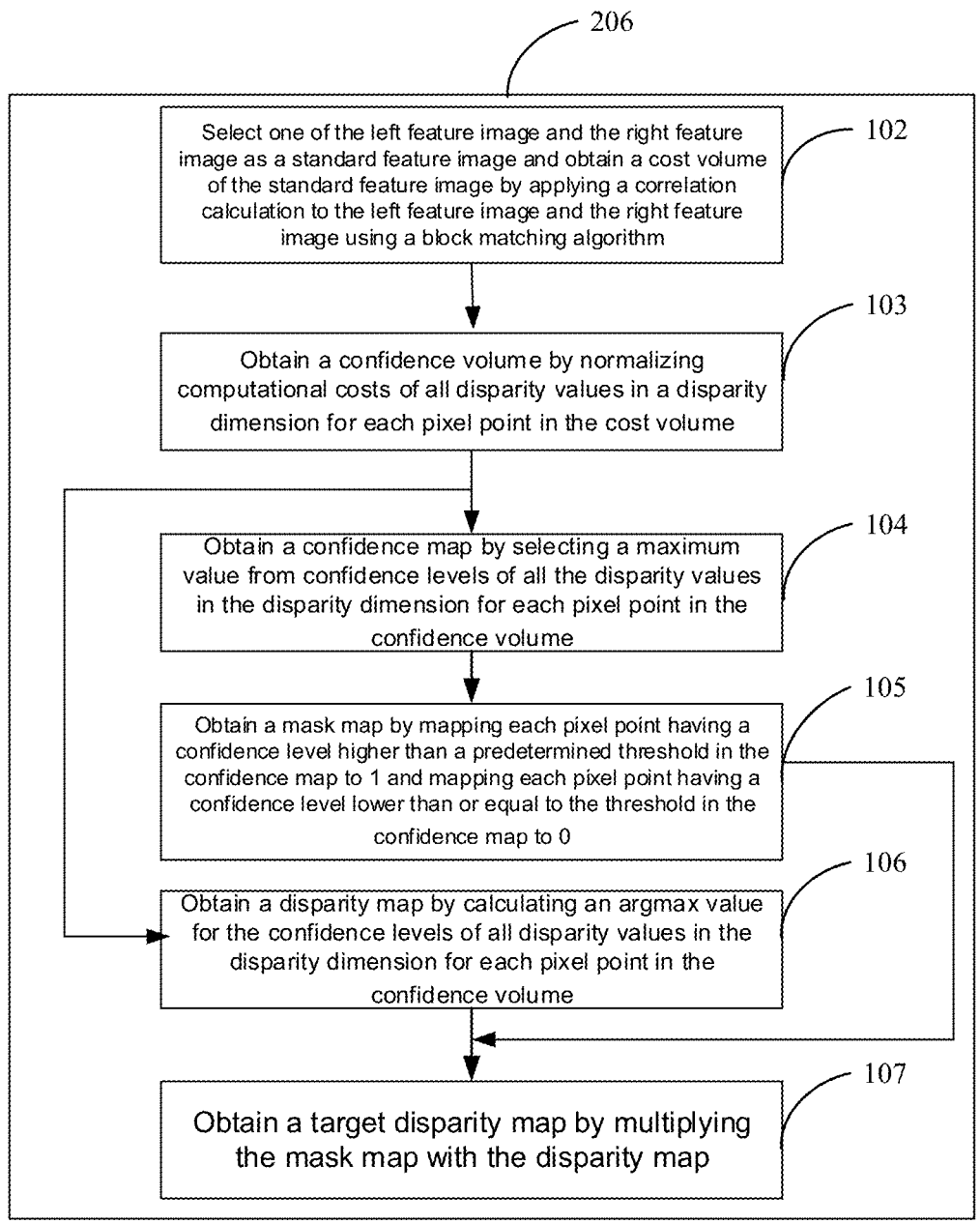
FIG. 12 is a flowchart illustrating Step 206 according to some embodiments of the present disclosure.

In particular, the step 206 includes the steps 102~107 as described above in connection with Embodiment 1, as shown in FIG. 12. For details of these steps, reference can be made to the relevant portion of Embodiment 1 and description thereof will be omitted here.

Embodiment 4

Figure 13:
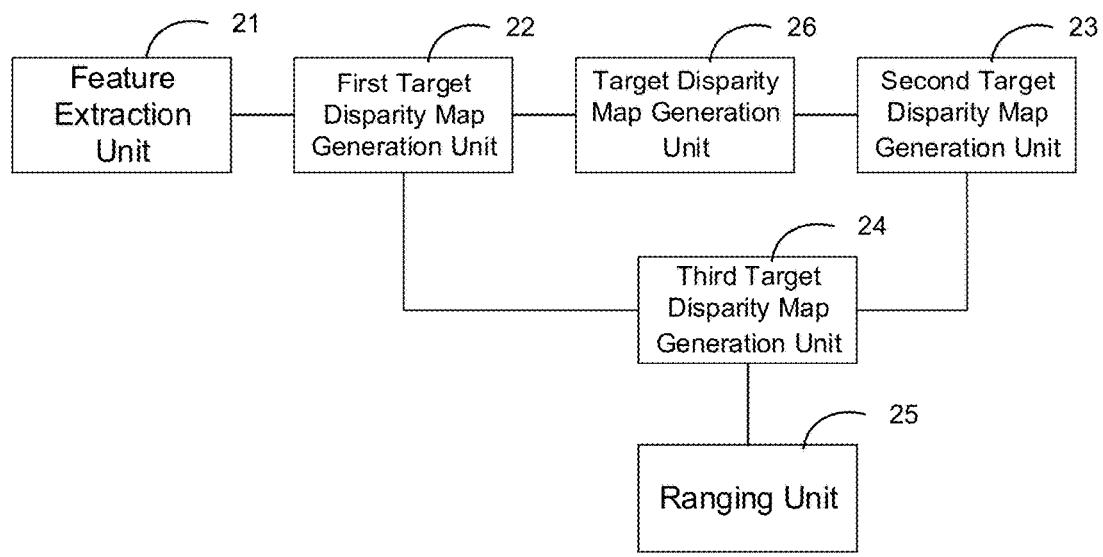
FIG. 13 is a schematic diagram showing a structure of an apparatus for binocular ranging according to some other embodiments of the present disclosure.

Based on the method for binocular ranging according to the above Embodiment 3, in Embodiment 4 of the present disclosure, an apparatus for binocular ranging is provided. The apparatus has a structure shown in FIG. 13, including:

a feature extraction unit 21 configured to extract features from a left image and a right image captured by a binocular camera to obtain a left feature image and a right feature image;

a first target disparity map generation unit 22 configured to generate a first target disparity map by using a target disparity map generation unit 26 with the left feature image being a standard feature image and the right feature image being a reference feature image;

a second target disparity map generation unit 23 configured to generate a second target disparity map by using the target disparity map generation unit 26 with the right feature image being the standard feature image and the left feature image being the reference feature image;

a third target disparity map generation unit 24 configured to select one of the first target disparity map and the second target disparity map as a standard target disparity map and the other one as a reference target disparity map and obtain a third target disparity map by filtering out each pixel point in the standard target disparity map that is inconsistent with its corresponding pixel point in the reference target disparity map;

a ranging unit 25 configured to estimate a distance based on the third target disparity map; and the target disparity map generation unit 26 configured to generate the target disparity map generation.

Figure 14:
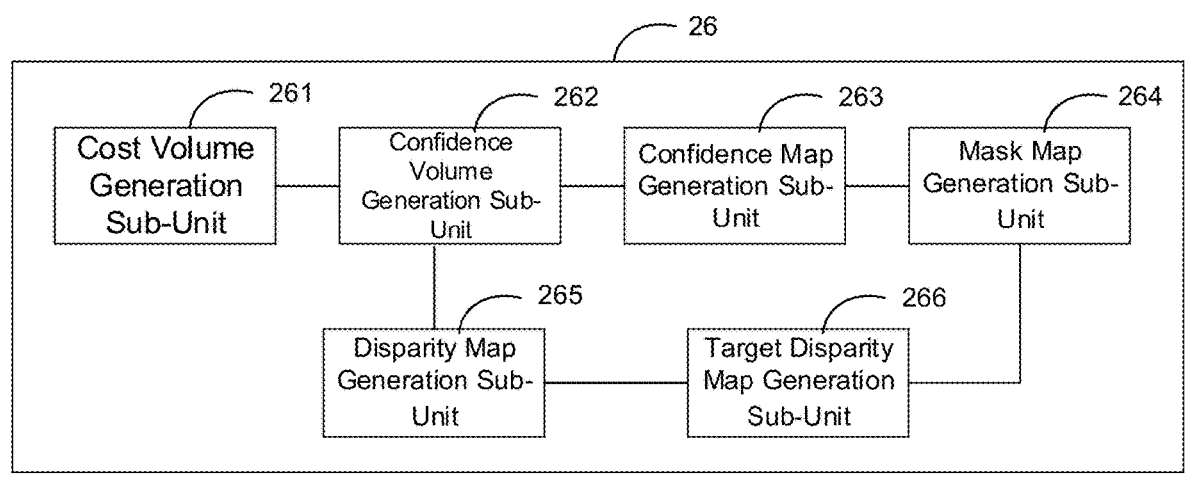
FIG. 14 is a schematic diagram showing a structure of a target disparity map generation unit according to some embodiments of the present disclosure.

In some embodiments of the present disclosure, the target disparity map generation unit 26 may have a structure shown in FIG. 14, including a cost volume generation sub-unit 261, a confidence volume generation sub-unit 262, a confidence map generation sub-unit 263, a mask map generation sub-unit 264, a disparity map generation sub-unit 265 and a target disparity map generation sub-unit 266.

The cost volume generation sub-unit 261 may be configured to select one of the left feature image and the right feature image as the standard feature image and obtain a cost volume of the standard feature image by applying a correlation calculation to the left feature image and the right feature image using a block matching algorithm.

The confidence volume generation sub-unit 262 may be configured to obtain a confidence volume by normalizing computational costs of all disparity values in a disparity dimension for each pixel point in the cost volume.

The confidence map generation sub-unit 263 may be configured to obtain a confidence map by selecting a maximum value from confidence levels of all the disparity values in the disparity dimension for each pixel point in the confidence volume.

The mask map generation sub-unit 264 may be configured to obtain a mask map by mapping each pixel point having a confidence level higher than a predetermined threshold in the confidence map to 1 and mapping each pixel point having a confidence level lower than or equal to the threshold in the confidence map to 0.

The disparity map generation sub-unit 265 may be configured to obtain a disparity map by calculating an argmax value for the confidence levels of all disparity values in the disparity dimension for each pixel point in the confidence volume.

The target disparity map generation sub-unit 266 is configured to obtain a target disparity map by multiplying the mask map with the disparity map.

In some embodiments of the present disclosure, for specific implementations of the cost volume generation sub-unit 261, the confidence volume generation sub-unit 262, the confidence map generation sub-unit 263, the mask map generation sub-unit 264, the disparity map generation sub-unit 265 and the target disparity map generation sub-unit 266, reference can be made to the cost volume generation unit 12, the confidence volume generation unit 13, the confidence map generation unit 14, the mask map generation unit 15, the disparity map generation unit 16 and the target disparity map generation unit 17 in Embodiment 2, and descriptions thereof will be omitted here.

In some embodiments of the present disclosure, the above apparatus shown in FIG. 12 may run on a processor, such as a CPU, of a DSP, an FPGA controller, an industrial computer, a vehicle computer, an ECU or a VCU.

A cost volume of the standard feature image is obtained by applying a correlation calculation to the left feature image and the right feature image using a block matching algorithm. A confidence volume is obtained by normalizing computational costs of all disparity values in a disparity dimension for each pixel point in the cost volume. A confidence map is obtained by selecting a maximum value from confidence levels of all the disparity values in the disparity dimension for each pixel point in the confidence volume. A mask map is obtained by mapping each pixel point having a confidence level higher than a predetermined threshold in the confidence map to 1 and mapping each pixel point having a confidence level lower than or equal to the threshold in the confidence map to 0. A disparity map is obtained by calculating an argmax value for the confidence levels of all disparity values in the disparity dimension for each pixel point in the confidence volume. A target disparity map is obtained by multiplying the mask map with the disparity map.

A cost volume of the standard feature image is obtained by applying a correlation calculation to the left feature image and the right feature image using a block matching algorithm. A confidence volume is obtained by normalizing computational costs of all disparity values in a disparity dimension for each pixel point in the cost volume. A confidence map is obtained by selecting a maximum value from confidence levels of all the disparity values in the disparity dimension for each pixel point in the confidence volume. A mask map is obtained by mapping each pixel point having a confidence level higher than a predetermined threshold in the confidence map to 1 and mapping each pixel point having a confidence level lower than or equal to the threshold in the confidence map to 0. A disparity map is obtained by calculating an argmax value for the confidence levels of all disparity values in the disparity dimension for each pixel point in the confidence volume. A target disparity map is obtained by multiplying the mask map with the disparity map.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for binocular ranging, comprising:
    extracting features from a left image and a right image captured by a binocular camera to obtain a left feature image and a right feature image;
    selecting one of the left feature image and the right feature image as a standard feature image, and obtaining a cost volume of the standard feature image by applying a correlation calculation to the left feature image and the right feature image using a block matching algorithm;
    obtaining a confidence volume by normalizing computational costs of all disparity values in a disparity dimension for each pixel point in the cost volume;
    obtaining a confidence map by selecting a maximum value from confidence levels of all the disparity values in the disparity dimension for each pixel point in the confidence volume;
    obtaining a mask map by mapping each pixel point having a confidence level higher than a predetermined threshold in the confidence map to 1 and mapping each pixel point having a confidence level lower than or equal to the threshold in the confidence map to 0;
    obtaining a disparity map by calculating an argmax value for the confidence levels of all disparity values in the disparity dimension for each pixel point in the confidence volume;
    obtaining a target disparity map by multiplying the mask map with the disparity map; and
    estimating a distance based on the target disparity map.

2. The method of claim 1, wherein said selecting one of the left feature image and the right feature image as the standard feature image and obtaining the cost volume of the standard feature image by applying the correlation calculation to the left feature image and the right feature image using the block matching algorithm comprises:
    selecting one of the left feature image and the right feature image as the standard feature image and the other one as a reference feature image; and
    obtaining the cost volume of the standard feature image by, for each standard pixel point in the standard feature image:
    selecting from the reference feature image a number, d, of reference pixel points corresponding to the standard pixel point in a predetermined horizontal movement direction corresponding to the standard feature image based on coordinates of the standard pixel point in the reference feature image;
    calculating an inner product between the standard pixel point and each reference pixel point corresponding to the standard pixel point to obtain computational costs between the standard pixel point and the respective reference pixel points, and creating a correspondence between the computational costs and disparity values between the standard pixel point and the respective reference pixel points; and
    arranging the d computational costs in a disparity dimension of the standard pixel point in an ascending order of their corresponding disparity values, to obtain the cost volume of the standard feature image.

3. The method of claim 2, wherein said selecting from the reference feature image the number, d, of reference pixel points corresponding to the standard pixel point in the predetermined horizontal movement direction corresponding to the standard feature image based on the coordinates of the standard pixel point in the reference feature image comprises:
    moving by a predetermined step length each time for d times in the horizontal movement direction based on the coordinates of the standard pixel point in the reference feature image, to obtain one reference pixel point corresponding to the standard pixel point each time, or
    selecting d consecutive pixel points in the horizontal movement direction based on the coordinates of the standard pixel point in the reference feature image, as the d reference pixel points corresponding to the standard pixel point.

4. The method of claim 2, wherein the horizontal movement direction is horizontally leftward when the standard feature image is the left feature image, or horizontally rightward when the standard feature image is the right feature image.

5. The method of claim 1, wherein said extracting the features from the left image and the right image captured by the binocular camera to obtain the left feature image and the right feature image comprises:
    inputting the left image to a first predetermined convolutional neural network to obtain the left feature image; and
    inputting the right image to a second predetermined convolutional neural network to obtain the right feature image, wherein the first convolutional neural network and the second convolutional neural network are twin networks.

6. The method of claim 1, wherein said normalizing the computational costs of all the disparity values in the disparity dimension for each pixel point in the cost volume comprises:
    normalizing the computational costs of all the disparity values in the disparity dimension for each pixel point in the cost volume using a softmax function, to obtain confidence levels of the respective disparity values in the disparity dimension for each pixel point and thus the confidence volume.

7. A method for binocular ranging, comprising:
extracting features from a left image and a right image captured by a binocular camera to obtain a left feature image and a right feature image;
obtaining a first target disparity map by performing a target disparity map generation step with the left feature image being a standard feature image and the right feature image being a reference feature image;
obtaining a second target disparity map by performing the target disparity map generation step with the right feature image being the standard feature image and the left feature image being the reference feature image;
selecting one of the first target disparity map and the second target disparity map as a standard target disparity map and the other one as a reference target disparity map, and obtaining a third target disparity map by filtering out each pixel point in the standard target disparity map that is inconsistent with its corresponding pixel point in the reference target disparity map; and
estimating a distance based on the third target disparity map,
wherein the target disparity map generation step comprises:
obtaining a cost volume of the standard feature image by applying a correlation calculation to the left feature image and the right feature image using a block matching algorithm;
obtaining a confidence volume by normalizing computational costs of all disparity values in a disparity dimension for each pixel point in the cost volume;
obtaining a confidence map by selecting a maximum value from confidence levels of all the disparity values in the disparity dimension for each pixel point in the confidence volume;
obtaining a mask map by mapping each pixel point having a confidence level higher than a predetermined threshold in the confidence map to 1 and mapping each pixel point having a confidence level lower than or equal to the threshold in the confidence map to 0;
obtaining a disparity map by calculating an argmax value for the confidence levels of all disparity values in the disparity dimension for each pixel point in the confidence volume; and
obtaining a target disparity map by multiplying the mask map with the disparity map.

8. An apparatus for binocular ranging, comprising:
a feature extraction unit configured to extract features from a left image and a right image captured by a binocular camera to obtain a left feature image and a right feature image;
a cost volume generation unit configured to select one of the left feature image and the right feature image as a standard feature image and obtain a cost volume of the standard feature image by applying a correlation calculation to the left feature image and the right feature image using a block matching algorithm;
a confidence volume generation unit configured to obtain a confidence volume by normalizing computational costs of all disparity values in a disparity dimension for each pixel point in the cost volume;
a confidence map generation unit configured to obtain a confidence map by selecting a maximum value from confidence levels of all the disparity values in the disparity dimension for each pixel point in the confidence volume;
a mask map generation unit configured to obtain a mask map by mapping each pixel point having a confidence level higher than a predetermined threshold in the confidence map to 1 and mapping each pixel point having a confidence level lower than or equal to the threshold in the confidence map to 0;
a disparity map generation unit configured to obtain a disparity map by calculating an argmax value for the confidence levels of all disparity values in the disparity dimension for each pixel point in the confidence volume;
a target disparity map generation unit configured to obtain a target disparity map by multiplying the mask map with the disparity map; and
a ranging unit configured to estimate a distance based on the target disparity map.

9. The apparatus of claim 8, wherein the cost volume generation unit comprises:
a selection sub-unit configured to select one of the left feature image and the right feature image as the standard feature image and the other one as a reference feature image; and
a generation sub-unit configured to obtain the cost volume of the standard feature image by, for each standard pixel point in the standard feature image:
selecting from the reference feature image a number, d, of reference pixel points corresponding to the standard pixel point in a predetermined horizontal movement direction corresponding to the standard feature image based on coordinates of the standard pixel point in the reference feature image;
calculating an inner product between the standard pixel point and each reference pixel point corresponding to the standard pixel point to obtain computational costs between the standard pixel point and the respective reference pixel points, and creating a correspondence between the computational costs and disparity values between the standard pixel point and the respective reference pixel points; and
arranging the d computational costs in a disparity dimension of the standard pixel point in an ascending order of their corresponding disparity values, to obtain the cost volume of the standard feature image.

10. The apparatus of claim 9, wherein the generation sub-unit selecting from the reference feature image the number, d, of reference pixel points corresponding to the standard pixel point in the predetermined horizontal movement direction corresponding to the standard feature image based on the coordinates of the standard pixel point in the reference feature image comprises:
moving by a predetermined step length each time for d times in the horizontal movement direction based on the coordinates of the standard pixel point in the reference feature image, to obtain one reference pixel point corresponding to the standard pixel point each time, or
selecting d consecutive pixel points in the horizontal movement direction based on the coordinates of the standard pixel point in the reference feature image, as the d reference pixel points corresponding to the standard pixel point.

11. The apparatus of claim 9, wherein the horizontal movement direction is horizontally leftward when the standard feature image is the left feature image, or horizontally rightward when the standard feature image is the right feature image.

12. The apparatus of claim 8, wherein the feature extraction unit is configured to:
input the left image to a first predetermined convolutional neural network to obtain the left feature image; and
input the right image to a second predetermined convolutional neural network to obtain the right feature image, wherein the first convolutional neural network and the second convolutional neural network are twin networks.

13. The apparatus of claim 8, wherein the confidence volume generation unit is configured to:
normalize the computational costs of all the disparity values in the disparity dimension for each pixel point in the cost volume using a softmax function, to obtain confidence levels of the respective disparity values in the disparity dimension for each pixel point and thus the confidence volume.

14. An apparatus for binocular ranging, comprising:
a feature extraction unit configured to extract features from a left image and a right image captured by a binocular camera to obtain a left feature image and a right feature image;
a first target disparity map generation unit configured to generate a first target disparity map by using a target disparity map generation unit with the left feature image being a standard feature image and the right feature image being a reference feature image;
a second target disparity map generation unit configured to generate a second target disparity map by using the target disparity map generation unit with the right feature image being the standard feature image and the left feature image being the reference feature image;
a third target disparity map generation unit configured to select one of the first target disparity map and the second target disparity map as a standard target disparity map and the other one as a reference target disparity map and obtain a third target disparity map by filtering out each pixel point in the standard target disparity map that is inconsistent with its corresponding pixel point in the reference target disparity map;
a ranging unit configured to estimate a distance based on the third target disparity map; and
the target disparity map generation unit comprising:
a cost volume generation sub-unit configured to select one of the left feature image and the right feature image as the standard feature image and obtain a cost volume of the standard feature image by applying a correlation calculation to the left feature image and the right feature image using a block matching algorithm;
a confidence volume generation sub-unit configured to obtain a confidence volume by normalizing computational costs of all disparity values in a disparity dimension for each pixel point in the cost volume;
a confidence map generation sub-unit configured to obtain a confidence map by selecting a maximum value from confidence levels of all the disparity values in the disparity dimension for each pixel point in the confidence volume;
a mask map generation sub-unit configured to obtain a mask map by mapping each pixel point having a confidence level higher than a predetermined threshold in the confidence map to 1 and mapping each pixel point having a confidence level lower than or equal to the threshold in the confidence map to 0;
a disparity map generation sub-unit configured to obtain a disparity map by calculating an argmax value for the confidence levels of all disparity values in the disparity dimension for each pixel point in the confidence volume; and
a target disparity map generation sub-unit configured to obtain a target disparity map by multiplying the mask map with the disparity map.

* * * * *